US012457360B2

(12) United States Patent
Kondo

(10) Patent No.: US 12,457,360 B2
(45) Date of Patent: Oct. 28, 2025

(54) IMAGE PROCESSING DEVICE AND IMAGE PROCESSING METHOD

(71) Applicant: Sony Group Corporation, Tokyo (JP)

(72) Inventor: Kenji Kondo, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 92 days.

(21) Appl. No.: 17/784,667

(22) PCT Filed: Dec. 18, 2020

(86) PCT No.: PCT/JP2020/047393
§ 371 (c)(1),
(2) Date: Jun. 13, 2022

(87) PCT Pub. No.: WO2021/125317
PCT Pub. Date: Jun. 24, 2021

(65) Prior Publication Data

US 2023/0009580 A1 Jan. 12, 2023

Related U.S. Application Data

(60) Provisional application No. 62/951,177, filed on Dec. 20, 2019.

(51) Int. Cl.
*H04N 19/00* (2014.01)
*H04N 19/176* (2014.01)
*H04N 19/593* (2014.01)

(52) U.S. Cl.
CPC ......... *H04N 19/593* (2014.11); *H04N 19/176* (2014.11)

(58) Field of Classification Search
CPC ..................................................... H04N 19/00
See application file for complete search history.

(56) References Cited

U.S. PATENT DOCUMENTS

2022/0264100 A1* 8/2022 Huo .................... H04N 19/132

FOREIGN PATENT DOCUMENTS

CN 106303532 A 1/2017
CN 107683606 A 2/2018
(Continued)

OTHER PUBLICATIONS

International Search Report and Written Opinion mailed on Feb. 16, 2021, received for PCT Application PCT/JP2020/047393, filed on Dec. 18, 2020, 6 pages including English Translation.
(Continued)

*Primary Examiner* — Maryam A Nasri
(74) *Attorney, Agent, or Firm* — XSENSUS, LLP

(57) ABSTRACT

The present technology relates to an image processing device and an image processing method that enable simplification of processing.
When matrix-based intra prediction that is intra prediction using a matrix operation is performed on a current prediction block to be encoded or decoded, matrix-based intra prediction is performed using a coefficient related to a sum of change amounts of pixel values and set to a fixed value, and a predicted image of the current prediction block is generated. Then, the current prediction block is encoded or decoded using the predicted image. The present technology can be applied, for example, in a case of encoding and decoding an image.

12 Claims, 70 Drawing Sheets

(56) References Cited

FOREIGN PATENT DOCUMENTS

| | | | |
|---|---|---|---|
| JP | 2022551542 | A | 12/2022 |
| WO | WO-2013108882 | A1 | 7/2013 |
| WO | PCT/CN2020/117911 | | 12/2020 |
| WO | WO-2021063270 | A1 | 4/2021 |
| WO | WO-2021114102 | A1 | 6/2021 |

OTHER PUBLICATIONS

Bross et al. "Versatile Video Coding (Draft 7)", Joint Video Experts Team (JVET) of ITU-T SG 16 WP 3 and ISO/IEC JTC 1/SC 29/WG 11, JVET-P2001-vE, Oct. 1-11, 2019, pp. 1-468.

Biatek et al., "Non-CE3: simplified MIP with power-of-two offset", Joint Video Experts Team (JVET) of ITU-T SG 16 WP 3 and ISO/IEC JTC 1/SC 29/WG 11, JVET-P0625-v2, Oct. 1-11, 2019, pp. 1-7.

Huo et al., "Non-CE3: MIP Simplification", Joint Video Experts Team (JVET) of ITU-T SG 16 WP 3 and ISO/IEC JTC 1/SC 29/WG 11, JVET-P0136-v2, Oct. 1-11, 2019, pp. 1-4.

Huo et al., "On fixed sW and fO in MIP", Joint Video Experts Team (JVET) of ITU-T SG 16 WP 3 and ISO/IEC JTC 1/SC 29/WG 11, JVET-Q0450-v2, Jan. 7-17, 2020, pp. 1-5.

Pfaff et al., "MIP with constant shifts and offsets", Joint Video Experts Team (JVET) of ITU-T SG 16 WP 3 and ISO/IEC JTC 1/SC 29/WG 11, JVET-Q0446-v2, Jan. 7-17, 2020, pp. 1-4.

Kondo (Sony) K et al: "On constant shift and offset in MIP", 17. JVET Meeting; Jan. 7, 2010-Jan. 17, 2020;Brussels; (The Joint Video Exploration Team of ISO/IEC JTC1/SC29/WG11 and SG.16), No. JVET-Q0161 ; m51750 Dec. 29, 2019 (Dec. 29, 2019), XP030222731.

Junyan Huo et al., "Non-CE3: MIP Simplification". Joint Video Experts Team (JVET); pp. 1-5 Oct. 11, 2019.

* cited by examiner

FIG. 1

For the intra sample prediction process according to predModeIntra, the following ordered steps apply:

1. The matrix-based intra prediction samples predMip[x][y], with x=0..predSize−1, y=0..predSize−1 are derived as follows:
   – The variable modeId is set equal to predModeIntra.
   – The weight matrix mWeight[x][y] with x=0..inSize−1, y=0..predSize*predSize−1 is derived by invoking the MIP weight matrix derivation process as specified in clause 8.4.5.2.3 with mipSizeId and modeId as inputs.
   – The variable sW is derived using mipSizeId and modeId as specified in Table 8-5.
   – The variable fO is derived using mipSizeId and modeId as specified in Table 8-6.
   – The matrix-based intra prediction samples predMip[x][y], with x=0..predSize−1, y=0..predSize−1 are derived as follows:

$$oW=(1<<(sW-1))-fO*\left(\sum_{i=0}^{inSize-1}p[i]\right) \quad (257)$$

$$predMip[x][y]=\left(\left(\left(\sum_{i=0}^{inSize-1}mWeight[i][y*predSize+x]*p[i]\right)+oW\right)>>sW\right)+pTemp[0] \quad (258)$$

2. The matrix-based intra prediction samples predMip[x][y], with x=0..predSize−1, y=0..predSize−1 are clipped as follows:

$$predMip[x][y]=Clip1(predMip[x][y]) \quad (259)$$

3. When isTransposed is equal to TRUE, the predSize x predSize array predMip[x][y] with x=0..predSize−1, y=0..predSize−1 is transposed as follows:

$$predTemp[y][x]=predMip[x][y] \quad (260)$$

$$predMip=predTemp \quad (261)$$

4. The prediction samples predSamples[x][y], with x=0..nTbW−1, y=0..nTbH−1 are derived as follows:
   – If nTbW is greater than predSize or nTbH is greater than predSize, the MIP prediction upsampling process as specified in clause 8.4.5.2.4 is invoked with the input block size predSize, matrix-based intra prediction samples predMip[x][y] with x=0..predSize−1, y=0..predSize−1, the transform block width nTbW, the transform block height nTbH, the top reference samples refT[x] with x=0..nTbW−1, and the left reference samples refL[y] with y=0..nTbH−1 as inputs, and the output is the predicted sample array predSamples.
   – Otherwise, predSamples[x][y], with x=0..nTbW−1, y=0..nTbH−1 is set equal to predMip[x][y].

Table 23 – Specification of weight shift sW depending on mipSizeId and modeId

| | modeId | | | | | | | | | | | | | | | |
|---|---|---|---|---|---|---|---|---|---|---|---|---|---|---|---|---|
| mipSizeId | 0 | 1 | 2 | 3 | 4 | 5 | 6 | 7 | 8 | 9 | 10 | 11 | 12 | 13 | 14 | 15 |
| 0 | 8 | 5 | 5 | 5 | 5 | 6 | 8 | 6 | 6 | 8 | 6 | 5 | 8 | 5 | 5 | 5 |
| 1 | 7 | 7 | 6 | 8 | 6 | 6 | 8 | 6 | | | | | | | | |
| 2 | 8 | 7 | 5 | 8 | 6 | 6 | | | | | | | | | | |

Table 24 – Specification of offset factor fO depending on mipSizeId and modeId

| | modeId | | | | | | | | | | | | | | | |
|---|---|---|---|---|---|---|---|---|---|---|---|---|---|---|---|---|
| mipSizeId | 0 | 1 | 2 | 3 | 4 | 5 | 6 | 7 | 8 | 9 | 10 | 11 | 12 | 13 | 14 | 15 |
| 0 | 1 | 20 | 28 | 42 | 56 | 22 | 9 | 8 | 15 | 14 | 50 | 66 | 20 | 50 | 21 | 19 |
| 1 | 15 | 14 | 23 | 45 | 16 | 14 | 10 | 27 | | | | | | | | |
| 2 | 15 | 18 | 40 | 16 | 14 | 11 | | | | | | | | | | |

FIG. 3

FIXED TO sW=5, f0=48

A

IN CASE WHERE CALCULATION BY MULTIPLICATION IS DESIRED $$oW=(1<<4)-48*(\sum_{i=0}^{inSize-1} p[i]) \quad (257)$$

$$predMip[x][y]=(((\sum_{i=0}^{inSize-1} mWeight[i][y*predSize+x]*p[i])+oW)>>5)+pTemp[0] \quad (258)$$

B

IN CASE WHERE CALCULATION BY SHIFT OPERATION AND ADDITION IS DESIRED $$sum=(\sum_{i=0}^{inSize-1} p[i])$$

$$oW=(1<<4)-(sum<<5)-(sum<<4) \quad (257)$$

$$predMip[x][y]=(((\sum_{i=0}^{inSize-1} mWeight[i][y*predSize+x]*p[i])+oW)>>5)+pTemp[0] \quad (258)$$

FIG. 4

```
ALIGN_DATA(MEMORY_ALIGN_DEF_SIZE, const short mipMatrix4x4[16][16][4])=
{
  {
    { 46, 56, 73, 49},
    { 46, 58, 57, 66},
    { 46, 55, 50, 75},
    { 46, 53, 50, 77},
    { 47, 50, 53, 77},
    { 46, 49, 50, 81},
    { 45, 47, 50, 81},
    { 45, 48, 51, 80},
    { 46, 49, 49, 81},
    { 45, 48, 50, 80},
    { 44, 48, 50, 80},
    { 43, 48, 50, 80},
    { 45, 49, 50, 80},
    { 44, 49, 51, 80},
    { 43, 49, 51, 80},
    { 43, 49, 51, 79}
  },
```

FIG. 5

```
{
  {  48,  47,  78,  46},
  {  48,  47,  72,  47},
  {  47,  59,  63,  48},
  {  48,  90,  58,  47},
  {  48,  48,  81,  48},
  {  48,  47,  82,  46},
  {  47,  50,  80,  45},
  {  51,  81,  69,  43},
  {  47,  48,  55,  74},
  {  47,  48,  62,  67},
  {  48,  46,  70,  56},
  {  60,  62,  66,  39},
  {  48,  48,  43,  84},
  {  47,  48,  44,  84},
  {  51,  44,  43,  78},
  {  76,  39,  41,  51}
},
```

FIG. 6

```
{
  {  48,  47,  59,  46},
  {  47,  52,  49,  47},
  {  47,  80,  51,  47},
  {  49,  88,  51,  46},
  {  48,  47,  71,  47},
  {  48,  59,  59,  46},
  {  50,  84,  53,  48},
  {  55,  84,  47,  55},
  {  49,  48,  58,  70},
  {  57,  64,  51,  71},
  {  66,  77,  42,  74},
  {  69,  73,  36,  78},
  {  57,  51,  32,  92},
  {  70,  67,  34,  84},
  {  76,  70,  35,  80},
  {  74,  68,  35,  80}
},
```

FIG. 7

```
{
  {  48,  46,  70,  51},
  {  47,  47,  50,  58},
  {  47,  73,  40,  55},
  {  49,  82,  44,  51},
  {  48,  47,  56,  73},
  {  49,  45,  48,  77},
  {  52,  58,  39,  69},
  {  59,  76,  37,  53},
  {  50,  47,  45,  82},
  {  59,  42,  44,  80},
  {  73,  36,  41,  75},
  {  81,  53,  36,  56},
  {  58,  43,  43,  81},
  {  75,  35,  42,  74},
  {  87,  28,  43,  68},
  {  90,  32,  44,  58}
},
```

FIG. 8

```
{
  {  47,  45,  65,  47},
  {  46,  67,  53,  47},
  {  49,  83,  45,  55},
  {  59,  79,  35,  66},
  {  46,  52,  72,  55},
  {  53,  63,  54,  65},
  {  74,  57,  40,  69},
  {  90,  42,  39,  65},
  {  54,  48,  45,  81},
  {  84,  35,  42,  69},
  { 102,  24,  45,  59},
  { 102,  22,  46,  57},
  {  78,  33,  39,  74},
  { 103,  20,  45,  57},
  { 104,  19,  47,  55},
  { 101,  21,  47,  56}
},
```

FIG. 9

```
{
  {  48,  47,  81,  41},
  {  47,  59,  67,  50},
  {  48,  69,  49,  63},
  {  48,  65,  37,  72},
  {  49,  50,  64,  67},
  {  49,  50,  52,  77},
  {  49,  48,  47,  81},
  {  49,  47,  46,  81},
  {  49,  48,  46,  81},
  {  49,  47,  46,  81},
  {  50,  47,  47,  81},
  {  50,  47,  47,  80},
  {  49,  47,  47,  80},
  {  50,  47,  47,  80},
  {  51,  47,  47,  79},
  {  53,  47,  48,  79}
},
```

FIG. 10

```
{
  {  48,  43,  49,  47},
  {  48,  53,  49,  47},
  {  48,  79,  49,  48},
  {  48,  81,  49,  48},
  {  48,  43,  49,  46},
  {  48,  53,  49,  47},
  {  48,  79,  49,  48},
  {  48,  81,  49,  48},
  {  48,  44,  49,  47},
  {  48,  53,  49,  47},
  {  48,  79,  49,  48},
  {  48,  81,  49,  48},
  {  48,  44,  49,  48},
  {  48,  53,  50,  47},
  {  48,  78,  49,  48},
  {  48,  81,  49,  48}
},
```

FIG. 11

```
[
  [48, 47, 75, 49],
  [48, 45, 62, 49],
  [48, 52, 47, 48],
  [48, 73, 45, 47],
  [48, 48, 82, 47],
  [48, 47, 80, 48],
  [48, 45, 70, 48],
  [48, 49, 55, 48],
  [47, 48, 72, 57],
  [48, 48, 80, 49],
  [48, 48, 82, 48],
  [48, 46, 75, 49],
  [49, 48, 46, 82],
  [48, 48, 63, 65],
  [48, 48, 76, 53],
  [48, 48, 78, 50]
]
```

FIG. 12

```
{
  {   48,   43,   69,   44},
  {   48,   50,   48,   47},
  {   48,   79,   46,   48},
  {   48,   82,   48,   48},
  {   50,   46,   84,   43},
  {   51,   48,   64,   43},
  {   50,   77,   47,   46},
  {   48,   81,   47,   48},
  {   50,   46,   63,   66},
  {   56,   45,   73,   45},
  {   56,   73,   54,   40},
  {   50,   80,   47,   47},
  {   50,   46,   44,   83},
  {   59,   43,   56,   66},
  {   66,   67,   61,   40},
  {   56,   77,   49,   44}
},
```

FIG. 13

```
{
  {  50,  44,  71,  41},
  {  51,  48,  60,  43},
  {  53,  73,  52,  46},
  {  55,  81,  47,  49},
  {  50,  47,  67,  64},
  {  52,  45,  59,  69},
  {  54,  50,  51,  73},
  {  55,  53,  46,  74},
  {  49,  48,  47,  81},
  {  49,  47,  47,  81},
  {  49,  47,  47,  81},
  {  49,  47,  48,  80},
  {  48,  48,  47,  81},
  {  48,  48,  48,  80},
  {  47,  49,  48,  80},
  {  47,  49,  49,  79}
},
```

FIG. 14

```
{
  {  48,  47,  65,  44},
  {  49,  45,  52,  45},
  {  51,  49,  48,  45},
  {  66,  77,  49,  37},
  {  48,  47,  69,  61},
  {  49,  45,  58,  64},
  {  56,  39,  47,  63},
  {  73,  47,  41,  53},
  {  48,  47,  48,  81},
  {  49,  47,  47,  81},
  {  51,  44,  47,  81},
  {  58,  39,  47,  76},
  {  48,  48,  46,  81},
  {  48,  47,  47,  81},
  {  48,  47,  47,  81},
  {  49,  45,  48,  80}
},
```

FIG. 15

```
{
  { 47, 47, 78, 43},
  { 48, 47, 72, 44},
  { 46, 65, 61, 46},
  { 55, 84, 52, 43},
  { 47, 49, 75, 56},
  { 46, 49, 75, 56},
  { 50, 57, 70, 51},
  { 84, 67, 51, 31},
  { 47, 49, 50, 79},
  { 46, 49, 50, 80},
  { 71, 42, 51, 62},
  { 110, 50, 47, 22},
  { 48, 48, 45, 83},
  { 52, 45, 44, 81},
  { 92, 31, 42, 58},
  { 114, 47, 46, 23}
},
```

FIG. 16

```
{
  {  49,  42,  60,  44},
  {  50,  51,  44,  47},
  {  49,  79,  47,  47},
  {  49,  82,  48,  47},
  {  51,  43,  74,  48},
  {  55,  45,  54,  44},
  {  54,  70,  47,  43},
  {  51,  78,  47,  45},
  {  53,  45,  53,  74},
  {  60,  40,  51,  68},
  {  62,  43,  41,  60},
  {  59,  50,  38,  53},
  {  51,  46,  45,  81},
  {  56,  43,  46,  79},
  {  60,  40,  45,  77},
  {  60,  41,  40,  73}
},
```

FIG. 17

```
{
  { 48, 46, 78, 47},
  { 48, 43, 71, 47},
  { 48, 46, 60, 47},
  { 48, 59, 52, 46},
  { 48, 48, 82, 46},
  { 48, 47, 82, 46},
  { 48, 46, 80, 47},
  { 48, 45, 74, 47},
  { 48, 48, 67, 62},
  { 47, 48, 75, 54},
  { 50, 46, 80, 48},
  { 61, 41, 79, 43},
  { 49, 46, 42, 85},
  { 58, 41, 48, 76},
  { 81, 30, 56, 56},
  { 99, 25, 62, 42}
},
```

FIG. 18

```
{
  { 50, 43, 54, 53},
  { 55, 59, 33, 57},
  { 54, 79, 52, 45},
  { 51, 71, 68, 39},
  { 55, 46, 39, 69},
  { 70, 61, 38, 48},
  { 63, 67, 71, 31},
  { 52, 57, 82, 36},
  { 62, 53, 38, 66},
  { 79, 57, 58, 27},
  { 64, 54, 82, 26},
  { 51, 51, 83, 38},
  { 63, 58, 53, 50},
  { 73, 54, 71, 20},
  { 60, 49, 81, 29},
  { 51, 50, 79, 41}
},
```

FIG. 19

```
{
  { 48, 49, 79, 48},
  { 48, 50, 78, 49},
  { 48, 56, 76, 48},
  { 48, 63, 72, 48},
  { 48, 51, 83, 47},
  { 48, 51, 84, 47},
  { 48, 51, 84, 47},
  { 48, 51, 82, 47},
  { 46, 51, 74, 56},
  { 48, 51, 76, 53},
  { 49, 50, 77, 52},
  { 49, 50, 76, 53},
  { 58, 43, 31, 94},
  { 64, 41, 31, 91},
  { 67, 40, 33, 88},
  { 67, 41, 35, 86}
 }
};
```

FIG. 20

```
ALIGN_DATA(MEMORY_ALIGN_DEF_SIZE, const short mipMatrix8x8[8][16][8])=
{
  {
    {   47,   64,   55,   51,   44,   49,   49,   49},
    {   47,   62,   65,   51,   48,   48,   48,   49},
    {   47,   54,   69,   53,   48,   48,   48,   48},
    {   47,   52,   63,   61,   48,   48,   48,   48},
    {   47,   65,   59,   52,   48,   47,   47,   50},
    {   46,   59,   66,   52,   49,   48,   48,   49},
    {   46,   56,   68,   53,   48,   49,   48,   48},
    {   46,   52,   68,   55,   48,   49,   48,   48},
    {   47,   65,   60,   52,   48,   49,   46,   49},
    {   46,   59,   66,   52,   48,   49,   47,   48},
    {   46,   55,   68,   54,   48,   48,   48,   48},
    {   46,   53,   67,   56,   48,   49,   48,   48},
    {   47,   63,   59,   52,   48,   49,   49,   47},
    {   46,   60,   65,   52,   49,   48,   49,   47},
    {   46,   55,   67,   54,   48,   49,   48,   48},
    {   46,   53,   65,   57,   48,   49,   48,   49}
  },
```

FIG. 21

```
{
  {  48,  48,  47,  48,  69,  47,  47,  48},
  {  48,  60,  46,  47,  53,  47,  48,  48},
  {  48,  70,  58,  45,  47,  49,  47,  48},
  {  48,  51,  72,  53,  47,  49,  47,  48},
  {  48,  48,  48,  47,  62,  70,  46,  48},
  {  48,  48,  47,  47,  71,  52,  46,  48},
  {  49,  56,  46,  47,  58,  46,  48,  48},
  {  49,  63,  54,  46,  49,  48,  47,  48},
  {  48,  48,  49,  47,  45,  64,  70,  45},
  {  48,  48,  49,  47,  55,  75,  50,  46},
  {  48,  45,  49,  47,  69,  59,  45,  48},
  {  48,  49,  49,  47,  63,  49,  47,  48},
  {  48,  47,  49,  47,  47,  46,  61,  69},
  {  48,  48,  50,  46,  45,  59,  70,  50},
  {  48,  47,  50,  46,  52,  72,  54,  47},
  {  48,  46,  51,  47,  61,  62,  48,  49}
},
```

FIG. 22

```
{
  {  48,  58,  46,  48,  46,  57,  47,  48},
  {  48,  79,  53,  47,  46,  53,  47,  48},
  {  48,  46,  81,  49,  47,  53,  47,  48},
  {  48,  49,  43,  84,  48,  53,  47,  48},
  {  48,  54,  47,  48,  37,  76,  52,  47},
  {  48,  70,  51,  47,  37,  70,  51,  47},
  {  48,  51,  71,  49,  39,  66,  51,  47},
  {  48,  47,  47,  76,  42,  61,  51,  47},
  {  48,  50,  48,  48,  46,  41,  85,  49},
  {  49,  54,  49,  47,  44,  41,  86,  48},
  {  50,  51,  54,  47,  44,  40,  86,  47},
  {  51,  47,  48,  59,  45,  39,  82,  48},
  {  50,  49,  48,  47,  46,  51,  39,  87},
  {  52,  48,  48,  47,  45,  51,  40,  86},
  {  54,  48,  48,  46,  45,  50,  40,  85},
  {  55,  47,  47,  48,  45,  49,  42,  83}
},
```

FIG. 23

```
{
  { 48, 56, 50, 50, 55, 66, 48, 47},
  { 48, 48, 61, 52, 46, 68, 49, 47},
  { 48, 47, 55, 64, 44, 63, 51, 47},
  { 48, 49, 47, 72, 45, 57, 53, 48},
  { 48, 47, 52, 51, 47, 67, 59, 48},
  { 48, 42, 55, 57, 45, 60, 64, 48},
  { 48, 47, 47, 65, 45, 52, 68, 48},
  { 50, 49, 46, 67, 45, 48, 65, 52},
  { 48, 46, 50, 52, 47, 45, 75, 55},
  { 50, 46, 49, 57, 47, 42, 71, 59},
  { 54, 47, 45, 60, 46, 41, 65, 63},
  { 57, 45, 46, 60, 43, 43, 56, 67},
  { 51, 47, 48, 51, 46, 47, 43, 84},
  { 57, 47, 46, 54, 44, 47, 40, 83},
  { 67, 44, 47, 52, 40, 51, 37, 80},
  { 71, 39, 50, 51, 36, 53, 36, 77}
},
```

FIG. 24

```
{
  {  48,  51,  48,  48,  82,  52,  46,  48},
  {  48,  52,  51,  48,  82,  50,  47,  48},
  {  48,  50,  55,  50,  79,  49,  47,  48},
  {  48,  49,  47,  63,  72,  49,  47,  47},
  {  48,  48,  49,  48,  43,  83,  52,  46},
  {  48,  47,  49,  48,  45,  84,  49,  46},
  {  48,  49,  48,  49,  47,  83,  48,  46},
  {  48,  48,  49,  50,  50,  79,  49,  46},
  {  48,  49,  48,  48,  49,  44,  82,  50},
  {  48,  49,  49,  48,  48,  47,  81,  48},
  {  48,  49,  49,  49,  48,  51,  79,  47},
  {  48,  49,  49,  50,  47,  55,  74,  47},
  {  48,  48,  48,  48,  47,  49,  43,  84},
  {  48,  49,  49,  48,  47,  48,  47,  81},
  {  48,  48,  49,  49,  48,  47,  52,  78},
  {  48,  49,  48,  50,  48,  47,  56,  73}
},
```

FIG. 25

```
{
  {  48,  58,  56,  47,  51,  70,  45,  48},
  {  48,  42,  63,  57,  44,  57,  58,  48},
  {  49,  47,  42,  69,  46,  47,  59,  57},
  {  49,  50,  44,  60,  47,  44,  52,  70},
  {  49,  45,  51,  52,  46,  51,  74,  50},
  {  50,  46,  44,  56,  48,  43,  61,  69},
  {  51,  50,  43,  51,  47,  46,  47,  83},
  {  51,  48,  49,  46,  47,  47,  45,  83},
  {  49,  48,  45,  51,  48,  45,  53,  78},
  {  51,  49,  46,  48,  47,  48,  41,  88},
  {  52,  48,  49,  45,  46,  49,  41,  87},
  {  52,  48,  49,  46,  46,  49,  44,  84},
  {  50,  48,  47,  48,  47,  48,  42,  85},
  {  51,  48,  48,  47,  47,  49,  42,  85},
  {  52,  48,  49,  47,  46,  49,  43,  84},
  {  52,  48,  48,  47,  47,  49,  44,  83}
},
```

FIG. 26

```
{
  {  48,  46,  48,  48,  78,  48,  47,  48},
  {  48,  47,  46,  49,  68,  45,  48,  47},
  {  49,  62,  45,  48,  55,  46,  48,  47},
  {  48,  63,  54,  50,  50,  48,  48,  47},
  {  48,  47,  48,  48,  54,  77,  49,  46},
  {  49,  46,  47,  49,  68,  67,  45,  47},
  {  49,  47,  45,  49,  75,  55,  46,  47},
  {  49,  51,  46,  48,  69,  48,  49,  46},
  {  49,  48,  47,  48,  46,  53,  79,  46},
  {  49,  48,  46,  49,  45,  68,  68,  43},
  {  49,  48,  46,  49,  50,  76,  55,  45},
  {  49,  48,  46,  49,  60,  69,  50,  46},
  {  49,  48,  47,  48,  49,  46,  53,  76},
  {  49,  48,  46,  48,  49,  44,  70,  62},
  {  49,  49,  46,  49,  47,  50,  77,  50},
  {  49,  49,  46,  49,  48,  59,  69,  48}
},
```

FIG. 27

```
  {
    { 49, 56, 45, 48, 45, 58, 46, 48},
    { 49, 68, 68, 44, 47, 48, 49, 48},
    { 48, 43, 67, 66, 48, 48, 48, 48},
    { 48, 49, 43, 85, 49, 48, 48, 48},
    { 49, 56, 48, 47, 34, 75, 54, 45},
    { 49, 54, 76, 46, 46, 51, 49, 47},
    { 48, 45, 55, 76, 48, 47, 48, 48},
    { 47, 48, 42, 86, 49, 48, 48, 49},
    { 49, 52, 53, 46, 45, 44, 78, 50},
    { 49, 45, 75, 53, 47, 49, 51, 47},
    { 48, 47, 48, 82, 48, 49, 47, 48},
    { 47, 48, 43, 85, 49, 48, 48, 49},
    { 49, 46, 56, 48, 48, 48, 40, 82},
    { 49, 44, 67, 62, 49, 49, 46, 54},
    { 47, 48, 47, 81, 48, 48, 48, 48},
    { 47, 48, 44, 83, 48, 48, 48, 49}
  }
};
```

*FIG. 28*

```
ALIGN_DATA(MEMORY_ALIGN_DEF_SIZE, const short
mipMatrix16x16[6][64][7])=
{
  {
    {  51,  47,  48,  65,  49,  49,  48},
    {  66,  43,  48,  53,  52,  49,  48},
    {  62,  44,  48,  50,  52,  49,  48},
    {  69,  64,  44,  48,  51,  49,  48},
    {  46,  81,  45,  47,  51,  49,  48},
    {  43,  71,  60,  46,  50,  49,  48},
    {  49,  50,  77,  47,  49,  49,  48},
    {  50,  43,  82,  48,  48,  50,  48},
    {  56,  47,  48,  69,  59,  46,  47},
    {  67,  44,  48,  62,  57,  50,  47},
    {  75,  48,  47,  55,  56,  51,  47},
    {  64,  64,  44,  49,  55,  51,  47},
    {  49,  75,  48,  46,  53,  52,  47},
    {  45,  64,  62,  45,  52,  53,  47}
    {  49,  48,  76,  47,  50,  53,  47},
    {  50,  43,  79,  48,  49,  53,  48},
    {  52,  46,  48,  54,  74,  48,  48},
    {  59,  48,  48,  57,  67,  52,  47},
    {  63,  51,  47,  54,  63,  54,  46},
    {  58,  60,  47,  50,  60,  56,  46},
    {  51,  64,  52,  47,  56,  57,  46},
    {  49,  56,  62,  45,  53,  57,  47},
    {  51,  47,  71,  46,  51,  57,  48},
    {  52,  44,  73,  47,  50,  56,  49},
    {  49,  49,  48,  46,  69,  61,  47},
    {  51,  50,  48,  49,  66,  61,  47},
    {  52,  52,  48,  50,  62,  63,  46},
    {  53,  54,  50,  49,  59,  64,  46},
    {  53,  53,  54,  47,  56,  64,  46},
    {  53,  50,  60,  46,  54,  64,  47},
    {  53,  47,  65,  45,  52,  62,  48},
    {  53,  46,  66,  46,  51,  60,  50},
    {  48,  49,  48,  48,  53,  76,  47},
    {  48,  50,  49,  48,  54,  74,  47},
    {  49,  51,  49,  48,  53,  73,  47},
    {  50,  50,  51,  48,  52,  73,  47},
    {  52,  48,  54,  48,  51,  72,  48},
    {  54,  46,  56,  47,  51,  71,  48},
    {  54,  47,  58,  46,  50,  69,  50},
    {  53,  47,  59,  46,  49,  65,  52},
    {  48,  49,  49,  49,  45,  75,  56},
    {  47,  49,  49,  49,  45,  76,  54},
    {  47,  49,  50,  49,  44,  77,  52},
    {  49,  48,  51,  49,  45,  77,  52},
    {  51,  46,  52,  49,  45,  76,  52},
    {  53,  46,  53,  48,  45,  75,  52},
    {  53,  47,  53,  48,  46,  72,  54},
    {  53,  48,  55,  49,  47,  68,  55},
    {  48,  48,  49,  48,  45,  59,  71}
    {  48,  48,  49,  49,  42,  66,  66},
    {  48,  48,  50,  50,  41,  70,  63},
    {  49,  47,  50,  50,  40,  72,  61},
    {  50,  46,  51,  50,  41,  72,  61},
    {  52,  47,  51,  50,  42,  71,  61},
    {  52,  47,  51,  49,  43,  69,  61},
    {  52,  48,  52,  48,  45,  66,  61},
    {  48,  48,  49,  48,  47,  48,  81},
    {  49,  47,  49,  49,  44,  55,  76},
    {  49,  47,  49,  50,  42,  59,  73},
    {  50,  47,  49,  50,  41,  62,  71},
    {  50,  47,  49,  50,  41,  63,  70},
    {  51,  47,  49,  50,  42,  63,  69},
    {  51,  48,  50,  50,  43,  63,  68},
    {  51,  48,  50,  49,  44,  62,  67}
  },
```

FIG. 29

```
[
  [54, 48, 50, 67, 53, 50, 48],
  [54, 51, 50, 55, 60, 52, 49],
  [50, 54, 51, 50, 62, 53, 49],
  [49, 54, 52, 49, 61, 54, 49],
  [49, 52, 54, 49, 60, 55, 50],
  [50, 51, 55, 49, 59, 55, 50],
  [49, 52, 56, 48, 59, 55, 50],
  [49, 51, 59, 48, 58, 55, 49],
  [50, 50, 50, 55, 67, 52, 49],
  [46, 51, 51, 49, 67, 57, 49],
  [43, 51, 52, 47, 66, 58, 49],
  [45, 47, 54, 47, 65, 59, 50],
  [48, 44, 54, 47, 64, 59, 50],
  [50, 45, 52, 47, 64, 59, 50],
  [49, 49, 50, 48, 64, 56, 50],
  [48, 51, 50, 48, 63, 58, 50],
  [47, 49, 50, 47, 70, 55, 49],
  [46, 49, 51, 46, 64, 61, 50],
  [46, 48, 52, 47, 63, 62, 50],
  [47, 47, 52, 47, 62, 61, 51],
  [47, 47, 52, 47, 63, 60, 51],
  [47, 47, 51, 47, 65, 59, 51],
  [48, 48, 50, 47, 65, 59, 51],
  [48, 49, 51, 48, 64, 58, 50],
  [48, 48, 50, 47, 64, 62, 49],
  [47, 48, 51, 47, 61, 62, 51],
  [47, 47, 52, 47, 61, 62, 52],
  [47, 48, 51, 47, 61, 61, 53],
  [47, 48, 51, 46, 63, 60, 52],
  [47, 48, 51, 46, 64, 59, 52],
  [47, 48, 51, 47, 64, 59, 51],
  [48, 48, 51, 47, 63, 59, 51],
  [48, 48, 50, 47, 56, 68, 51],
  [47, 47, 51, 47, 60, 62, 53],
  [47, 48, 51, 47, 60, 61, 54],
  [47, 48, 51, 46, 61, 61, 54],
  [47, 48, 51, 46, 61, 61, 53],
  [47, 48, 52, 46, 62, 61, 52],
  [48, 47, 52, 46, 62, 61, 51],
  [48, 48, 52, 47, 61, 61, 51],
  [48, 48, 50, 47, 53, 65, 57],
  [47, 48, 51, 46, 58, 63, 55],
  [47, 48, 51, 46, 59, 62, 55],
  [47, 48, 51, 46, 59, 62, 54],
  [47, 47, 52, 46, 59, 63, 53],
  [48, 47, 52, 46, 59, 64, 52],
  [48, 47, 52, 47, 59, 64, 51],
  [48, 48, 52, 47, 58, 63, 51],
  [48, 48, 50, 47, 52, 58, 66],
  [47, 48, 50, 46, 55, 63, 58],
  [47, 48, 51, 46, 57, 64, 54],
  [47, 48, 51, 46, 57, 64, 54],
  [47, 47, 52, 47, 57, 64, 53],
  [49, 47, 52, 47, 56, 65, 52],
  [48, 47, 52, 47, 56, 65, 52],
  [48, 47, 52, 47, 56, 64, 52],
  [48, 48, 50, 47, 51, 54, 70],
  [48, 48, 50, 47, 53, 62, 60],
  [47, 48, 51, 47, 55, 64, 56],
  [48, 48, 51, 47, 56, 64, 55],
  [48, 48, 52, 47, 56, 64, 54],
  [48, 47, 52, 47, 55, 64, 53],
  [49, 47, 53, 48, 55, 64, 53],
  [49, 47, 53, 48, 55, 63, 53]
],
```

FIG. 30

```
{
    [ 54, 49, 48, 57, 52, 49, 49],
    [ 67, 47, 47, 44, 54, 49, 49],
    [ 76, 50, 47, 42, 53, 50, 49],
    [ 69, 63, 46, 41, 51, 50, 50],
    [ 54, 76, 47, 41, 50, 50, 51],
    [ 46, 77, 55, 41, 49, 50, 52],
    [ 46, 59, 73, 42, 48, 48, 53],
    [ 52, 33, 94, 44, 47, 43, 57],
    [ 57, 47, 49, 50, 63, 60, 48],
    [ 69, 48, 47, 38, 59, 55, 49],
    [ 74, 52, 47, 33, 55, 56, 50],
    [ 68, 63, 46, 33, 52, 56, 51],
    [ 56, 75, 47, 34, 50, 54, 54],
    [ 47, 78, 54, 35, 48, 51, 57],
    [ 47, 61, 72, 38, 46, 46, 61],
    [ 53, 32, 94, 41, 45, 39, 66],
    [ 56, 48, 48, 41, 68, 65, 48],
    [ 67, 49, 47, 33, 59, 62, 49],
    [ 73, 52, 47, 28, 53, 63, 52],
    [ 69, 62, 46, 27, 50, 60, 55],
    [ 58, 74, 47, 29, 47, 55, 60],
    [ 49, 78, 53, 31, 45, 49, 65],
    [ 48, 61, 71, 35, 43, 41, 71],
    [ 53, 32, 95, 39, 42, 32, 78],
    [ 55, 49, 48, 37, 62, 66, 49],
    [ 66, 49, 47, 29, 55, 67, 52],
    [ 73, 52, 47, 24, 51, 64, 57],
    [ 70, 61, 46, 24, 48, 58, 63],
    [ 59, 73, 47, 26, 45, 52, 69],
    [ 50, 78, 53, 29, 42, 43, 76],
    [ 48, 61, 71, 34, 41, 33, 84],
    [ 53, 32, 95, 38, 40, 23, 90],
    [ 54, 49, 48, 37, 53, 72, 52],
    [ 65, 49, 47, 26, 53, 65, 59],
    [ 72, 52, 47, 21, 51, 58, 66],
    [ 70, 61, 46, 21, 47, 51, 74],
    [ 60, 73, 47, 24, 43, 43, 82],
    [ 50, 78, 53, 27, 41, 33, 90],
    [ 48, 62, 71, 32, 39, 23, 97],
    [ 54, 32, 95, 36, 38, 15, 102],
    [ 54, 48, 48, 37, 49, 67, 62],
    [ 64, 50, 47, 26, 51, 58, 70],
    [ 71, 53, 47, 21, 49, 49, 79],
    [ 70, 62, 46, 21, 45, 40, 87],
    [ 61, 73, 47, 23, 42, 31, 96],
    [ 51, 77, 53, 27, 39, 21, 104],
    [ 49, 61, 71, 30, 37, 13, 110],
    [ 54, 33, 95, 34, 36, 8, 112],
    [ 54, 49, 49, 38, 48, 51, 79],
    [ 63, 50, 47, 28, 48, 44, 86],
    [ 70, 54, 47, 23, 46, 35, 94],
    [ 68, 62, 47, 23, 43, 28, 102],
    [ 61, 72, 48, 24, 40, 19, 109],
    [ 52, 75, 55, 26, 37, 11, 116],
    [ 50, 60, 72, 29, 35, 5, 120],
    [ 54, 34, 94, 33, 34, 4, 120],
    [ 54, 49, 48, 39, 47, 34, 95],
    [ 61, 51, 48, 32, 45, 29, 101],
    [ 67, 55, 48, 27, 43, 23, 107],
    [ 66, 62, 48, 25, 40, 17, 113],
    [ 60, 70, 50, 26, 38, 11, 118],
    [ 53, 71, 58, 27, 36, 6, 122],
    [ 51, 57, 74, 29, 34, 2, 125],
    [ 54, 34, 93, 33, 32, 2, 124]
},
```

FIG. 31

```
{
  [ 49, 48, 48, 75, 47, 48, 48],
  [ 58, 47, 48, 71, 49, 47, 48],
  [ 72, 45, 48, 70, 50, 47, 49],
  [ 72, 55, 46, 67, 51, 46, 49],
  [ 56, 71, 45, 65, 52, 46, 49],
  [ 47, 72, 52, 62, 54, 45, 49],
  [ 49, 54, 70, 59, 55, 45, 49],
  [ 52, 40, 80, 56, 56, 46, 49],
  [ 51, 48, 48, 72, 63, 45, 49],
  [ 53, 48, 48, 71, 65, 44, 49],
  [ 57, 48, 48, 69, 67, 43, 49],
  [ 60, 50, 48, 66, 69, 43, 50],
  [ 58, 55, 48, 64, 71, 42, 50],
  [ 54, 58, 50, 61, 72, 43, 49],
  [ 53, 52, 57, 58, 72, 44, 49],
  [ 53, 45, 65, 55, 69, 46, 49],
  [ 49, 49, 48, 51, 81, 45, 49],
  [ 49, 49, 48, 51, 80, 46, 49],
  [ 49, 49, 48, 50, 81, 47, 49],
  [ 51, 48, 48, 50, 80, 48, 49],
  [ 53, 48, 49, 50, 79, 50, 48],
  [ 53, 49, 49, 50, 77, 52, 48],
  [ 52, 50, 50, 50, 74, 54, 48],
  [ 52, 48, 54, 50, 70, 55, 49],
  [ 48, 48, 48, 45, 70, 63, 47],
  [ 48, 48, 48, 45, 68, 65, 47],
  [ 48, 49, 48, 46, 65, 67, 47],
  [ 48, 48, 48, 46, 63, 69, 47],
  [ 50, 48, 48, 47, 60, 72, 47],
  [ 51, 48, 48, 48, 58, 73, 47],
  [ 51, 49, 48, 49, 56, 73, 48],
  [ 51, 49, 49, 49, 56, 69, 50],
  [ 49, 48, 48, 48, 50, 79, 48],
  [ 49, 48, 48, 48, 49, 78, 50],
  [ 49, 48, 48, 48, 48, 78, 51],
  [ 49, 48, 48, 49, 46, 78, 52],
  [ 49, 48, 48, 49, 45, 77, 54],
  [ 50, 48, 48, 49, 45, 75, 55],
  [ 50, 48, 47, 49, 46, 73, 57],
  [ 50, 49, 48, 49, 48, 69, 59],
  [ 49, 48, 48, 49, 45, 70, 61],
  [ 49, 48, 48, 49, 45, 67, 64],
  [ 49, 48, 48, 49, 45, 65, 66],
  [ 49, 48, 47, 49, 45, 63, 68],
  [ 49, 49, 47, 49, 45, 61, 70],
  [ 49, 49, 47, 49, 45, 60, 71],
  [ 49, 49, 47, 49, 46, 58, 72],
  [ 50, 49, 48, 49, 47, 57, 72],
  [ 48, 48, 48, 48, 47, 52, 76],
  [ 48, 48, 48, 48, 47, 51, 79],
  [ 49, 48, 48, 48, 47, 49, 80],
  [ 49, 49, 47, 48, 47, 49, 81],
  [ 49, 49, 47, 49, 47, 48, 82],
  [ 49, 49, 47, 49, 47, 48, 82],
  [ 49, 49, 47, 49, 47, 48, 82],
  [ 50, 48, 48, 49, 47, 49, 80],
  [ 48, 48, 48, 48, 48, 44, 84],
  [ 49, 48, 48, 48, 48, 44, 84],
  [ 49, 49, 48, 48, 48, 44, 85],
  [ 49, 49, 47, 48, 48, 44, 85],
  [ 49, 49, 47, 48, 47, 44, 85],
  [ 50, 49, 48, 49, 47, 43, 85],
  [ 50, 49, 48, 49, 47, 44, 85],
  [ 50, 49, 48, 49, 47, 45, 83]
],
```

FIG. 32

```
[
  [ 55, 47, 48, 67, 50, 47, 49],
  [ 69, 47, 48, 53, 57, 45, 49],
  [ 68, 57, 47, 47, 58, 46, 49],
  [ 52, 72, 49, 45, 55, 50, 48],
  [ 43, 68, 59, 45, 51, 52, 48],
  [ 46, 52, 73, 46, 48, 53, 49],
  [ 49, 42, 78, 46, 47, 52, 53],
  [ 49, 42, 75, 47, 46, 51, 58],
  [ 55, 49, 48, 62, 69, 42, 50],
  [ 55, 56, 48, 50, 69, 46, 49],
  [ 48, 62, 51, 44, 62, 53, 48],
  [ 44, 59, 60, 44, 54, 56, 48],
  [ 46, 48, 69, 46, 48, 59, 51],
  [ 49, 41, 72, 47, 45, 58, 57],
  [ 49, 41, 69, 47, 44, 54, 63],
  [ 49, 44, 64, 47, 45, 51, 67],
  [ 48, 52, 49, 45, 78, 50, 48],
  [ 45, 55, 52, 46, 64, 61, 47],
  [ 44, 52, 57, 47, 52, 67, 49],
  [ 47, 46, 62, 48, 45, 66, 55],
  [ 49, 41, 64, 48, 43, 61, 62],
  [ 50, 42, 62, 48, 43, 55, 69],
  [ 49, 45, 58, 47, 44, 51, 74],
  [ 48, 47, 56, 47, 46, 48, 75],
  [ 46, 50, 50, 45, 59, 72, 45],
  [ 46, 49, 54, 48, 47, 74, 50],
  [ 47, 46, 57, 50, 43, 68, 59],
  [ 49, 43, 58, 49, 43, 59, 68],
  [ 49, 43, 57, 49, 45, 52, 75],
  [ 49, 45, 54, 48, 45, 48, 79],
  [ 48, 47, 52, 48, 46, 46, 80],
  [ 47, 48, 52, 47, 47, 46, 80],
  [ 47, 48, 51, 49, 44, 78, 52],
  [ 48, 46, 53, 50, 43, 66, 64],
  [ 48, 44, 54, 49, 45, 54, 74],
  [ 49, 44, 54, 49, 46, 48, 79],
  [ 48, 45, 52, 48, 47, 44, 82],
  [ 48, 47, 51, 48, 48, 43, 83],
  [ 48, 48, 50, 48, 48, 44, 83],
  [ 47, 48, 50, 47, 48, 45, 82],
  [ 48, 47, 50, 49, 45, 61, 69],
  [ 48, 45, 52, 49, 47, 50, 78],
  [ 48, 45, 52, 48, 48, 44, 83],
  [ 48, 46, 51, 48, 48, 42, 85],
  [ 48, 47, 50, 48, 48, 42, 85],
  [ 48, 48, 49, 48, 48, 42, 85],
  [ 47, 48, 49, 47, 49, 42, 84],
  [ 47, 48, 49, 47, 49, 44, 82],
  [ 48, 46, 50, 48, 48, 46, 81],
  [ 48, 46, 51, 48, 49, 42, 84],
  [ 48, 46, 50, 48, 49, 41, 86],
  [ 48, 47, 50, 48, 49, 41, 86],
  [ 48, 47, 49, 48, 49, 41, 85],
  [ 47, 48, 49, 48, 49, 42, 85],
  [ 47, 48, 49, 47, 49, 43, 84],
  [ 47, 48, 49, 47, 49, 44, 82],
  [ 48, 47, 50, 48, 49, 42, 84],
  [ 48, 46, 50, 48, 49, 42, 85],
  [ 48, 47, 50, 48, 49, 42, 85],
  [ 48, 47, 49, 48, 49, 42, 84],
  [ 48, 48, 49, 48, 49, 43, 84],
  [ 47, 48, 49, 47, 49, 43, 83],
  [ 47, 48, 49, 47, 49, 44, 82],
  [ 47, 48, 49, 47, 49, 44, 81]
],
```

FIG. 33

```
[
  [ 48, 48, 48, 69, 47, 48, 48],
  [ 52, 48, 48, 58, 49, 48, 48],
  [ 62, 46, 48, 53, 49, 48, 48],
  [ 71, 50, 47, 50, 49, 48, 48],
  [ 66, 61, 46, 49, 49, 49, 48],
  [ 54, 73, 47, 48, 49, 48, 48],
  [ 47, 68, 59, 48, 48, 48, 48],
  [ 49, 50, 76, 49, 48, 48, 48],
  [ 50, 48, 48, 74, 55, 47, 48],
  [ 49, 49, 48, 71, 51, 48, 47],
  [ 51, 48, 48, 64, 50, 48, 48],
  [ 59, 47, 48, 57, 49, 48, 48],
  [ 67, 49, 47, 53, 49, 48, 48],
  [ 65, 58, 46, 51, 49, 48, 49],
  [ 56, 67, 48, 50, 49, 48, 48],
  [ 51, 63, 58, 49, 49, 46, 48],
  [ 49, 48, 48, 59, 72, 46, 48],
  [ 49, 48, 48, 66, 64, 47, 48],
  [ 48, 49, 48, 68, 58, 47, 48],
  [ 51, 48, 48, 65, 54, 48, 47],
  [ 58, 46, 48, 61, 51, 48, 47],
  [ 63, 49, 47, 57, 50, 49, 47],
  [ 62, 56, 47, 53, 50, 49, 47],
  [ 57, 61, 50, 51, 50, 48, 47],
  [ 48, 48, 48, 48, 74, 55, 46],
  [ 48, 48, 48, 54, 73, 50, 47],
  [ 48, 49, 48, 60, 69, 48, 47],
  [ 49, 48, 48, 63, 64, 47, 47],
  [ 51, 48, 48, 63, 59, 47, 47],
  [ 56, 47, 48, 61, 56, 48, 47],
  [ 59, 50, 47, 58, 54, 48, 47],
  [ 58, 54, 48, 55, 53, 48, 47],
  [ 48, 48, 48, 47, 59, 73, 45],
  [ 48, 48, 48, 48, 67, 63, 46],
  [ 48, 48, 48, 51, 72, 56, 46],
  [ 48, 48, 48, 55, 72, 61, 47],
  [ 49, 48, 48, 58, 68, 48, 47],
  [ 51, 48, 48, 60, 64, 47, 47],
  [ 54, 48, 48, 59, 60, 47, 47],
  [ 56, 50, 48, 57, 57, 48, 47],
  [ 48, 48, 48, 49, 47, 77, 51],
  [ 48, 48, 48, 49, 54, 75, 47],
  [ 48, 48, 48, 49, 62, 69, 46],
  [ 48, 48, 48, 50, 68, 61, 46],
  [ 48, 48, 48, 53, 71, 54, 46],
  [ 49, 48, 48, 55, 69, 51, 47],
  [ 51, 48, 48, 57, 66, 49, 47],
  [ 52, 49, 48, 57, 62, 50, 47],
  [ 48, 48, 48, 49, 47, 60, 69],
  [ 48, 48, 48, 49, 48, 68, 59],
  [ 48, 48, 48, 49, 53, 71, 52],
  [ 48, 48, 48, 49, 59, 69, 49],
  [ 46, 48, 48, 50, 65, 63, 47],
  [ 48, 48, 48, 51, 67, 58, 47],
  [ 49, 49, 48, 54, 67, 55, 47],
  [ 50, 49, 48, 55, 64, 53, 48],
  [ 48, 48, 48, 48, 51, 42, 83],
  [ 48, 48, 48, 48, 50, 50, 75],
  [ 48, 48, 48, 49, 51, 59, 66],
  [ 48, 49, 48, 49, 54, 64, 58],
  [ 48, 49, 48, 49, 57, 65, 53],
  [ 48, 49, 48, 50, 61, 63, 50],
  [ 48, 49, 48, 51, 63, 59, 49],
  [ 49, 49, 48, 53, 63, 57, 49]
 ]
]:
```

FIG. 34

FIXED TO sW=6, f0=96

A

IN CASE WHERE CALCULATION BY MULTIPLICATION IS DESIRED $$oW=(1<<5)-96*(\sum_{i=0}^{inSize-1} p[i]) \quad (257)$$

$$predMip[x][y]=(((\sum_{i=0}^{inSize-1} mWeight[i][y*predSize+x]*p[i])+oW)>>6)+pTemp[0] \quad (258)$$

B

IN CASE WHERE CALCULATION BY SHIFT OPERATION AND ADDITION IS DESIRED $$sum=(\sum_{i=0}^{inSize-1} p[i])$$

$$oW=(1<<5)-(sum<<6)-(sum<<5) \quad (257)$$

$$predMip[x][y]=(((\sum_{i=0}^{inSize-1} mWeight[i][y*predSize+x]*p[i])+oW)>>6)+pTemp[0] \quad (258)$$

FIG. 35

```
ALIGN_DATA(MEMORY_ALIGN_DEF_SIZE, const short
mipMatrix4x4[16][16][4])=
{
  {
    {   92,  111,  146,   97},
    {   92,  117,  113,  131},
    {   92,  110,  100,  150},
    {   92,  105,  101,  154},
    {   93,  101,  107,  154},
    {   92,   98,   99,  161},
    {   90,   95,  100,  162},
    {   89,   96,  102,  160},
    {   91,   97,   98,  162},
    {   90,   96,  100,  161},
    {   88,   96,  101,  161},
    {   87,   97,  101,  161},
    {   90,   98,   99,  159},
    {   88,   97,  101,  159},
    {   87,   97,  101,  160},
    {   87,   98,  102,  159}
  },
```

FIG. 36

```
{
 { 96,  94, 156,  91},
 { 96,  93, 144,  94},
 { 94, 118, 126,  95},
 { 96, 179, 115,  94},
 { 95,  96, 162,  96},
 { 96,  94, 164,  92},
 { 95,  99, 160,  90},
 {101, 162, 137,  85},
 { 95,  96, 110, 147},
 { 94,  95, 123, 135},
 { 95,  93, 141, 112},
 {121, 125, 133,  78},
 { 95,  97,  86, 169},
 { 94,  96,  87, 168},
 {103,  88,  86, 156},
 {151,  77,  82, 103}
},
```

FIG. 37

```
{
   {  96,  94, 118,  91},
   {  95, 104,  99,  95},
   {  95, 160, 101,  93},
   {  98, 176, 102,  92},
   {  95,  95, 142,  94},
   {  96, 117, 117,  92},
   { 101, 168, 106,  96},
   { 109, 169,  93, 109},
   {  97,  96, 116, 139},
   { 114, 128, 103, 142},
   { 132, 153,  84, 148},
   { 138, 146,  73, 156},
   { 114, 103,  64, 184},
   { 139, 134,  68, 169},
   { 151, 140,  71, 161},
   { 147, 137,  71, 161}
},
```

FIG. 38

```
{
    {  96,  91, 140, 103},
    {  94,  93,  99, 115},
    {  93, 145,  80, 110},
    {  97, 165,  87, 102},
    {  97,  95, 113, 146},
    {  98,  90,  97, 155},
    { 104, 117,  78, 138},
    { 117, 151,  73, 106},
    {  99,  94,  91, 165},
    { 119,  83,  88, 160},
    { 145,  72,  81, 149},
    { 163, 106,  72, 112},
    { 115,  87,  85, 162},
    { 150,  70,  84, 149},
    { 174,  57,  86, 135},
    { 180,  64,  87, 115}
 },
```

FIG. 39

```
{
    {  95,  89, 131,  94},
    {  91, 133, 105,  94},
    {  97, 167,  90, 109},
    { 118, 158,  69, 133},
    {  91, 104, 144, 110},
    { 106, 126, 107, 130},
    { 148, 113,  81, 138},
    { 180,  84,  77, 129},
    { 107,  96,  90, 161},
    { 168,  70,  85, 139},
    { 204,  47,  90, 117},
    { 205,  43,  92, 115},
    { 155,  65,  78, 148},
    { 205,  40,  90, 113},
    { 207,  38,  95, 109},
    { 201,  42,  94, 112}
},
```

FIG. 40

```
{
   {   95,    93,   162,    82},
   {   95,   118,   135,    99},
   {   95,   138,    98,   126},
   {   97,   130,    74,   145},
   {   97,   100,   127,   135},
   {   98,   100,   105,   154},
   {   98,    96,    95,   162},
   {   99,    94,    91,   162},
   {   98,    96,    93,   163},
   {   98,    95,    93,   163},
   {  100,    94,    94,   162},
   {  101,    93,    95,   160},
   {   99,    94,    94,   161},
   {  100,    95,    95,   160},
   {  102,    95,    95,   159},
   {  105,    93,    95,   157}
},
```

FIG. 41

```
{
  {   96,   87,   98,   93},
  {   96,  106,   98,   95},
  {   96,  157,   98,   95},
  {   96,  163,   99,   95},
  {   96,   87,   99,   93},
  {   96,  106,   98,   94},
  {   96,  157,   98,   96},
  {   96,  163,   99,   96},
  {   96,   87,   99,   93},
  {   96,  107,   99,   94},
  {   96,  157,   99,   96},
  {   96,  162,   99,   96},
  {   96,   88,   98,   95},
  {   96,  107,   99,   95},
  {   96,  157,   99,   95},
  {   96,  162,   98,   96}
}
```

FIG. 42

```
{
    {   96,   93,  151,   97},
    {   95,   90,  124,   97},
    {   95,  103,   95,   96},
    {   96,  146,   91,   94},
    {   96,   97,  164,   95},
    {   96,   94,  160,   96},
    {   96,   90,  141,   96},
    {   96,   98,  109,   95},
    {   95,   97,  145,  113},
    {   95,   97,  161,   98},
    {   96,   95,  164,   95},
    {   96,   93,  149,   97},
    {   97,   95,   93,  164},
    {   96,   96,  126,  131},
    {   95,   97,  152,  105},
    {   96,   97,  156,  100}
},
```

FIG. 43

```
{
    {  96,  87, 139,  89},
    {  97, 100,  96,  94},
    {  97, 157,  93,  96},
    {  96, 163,  96,  96},
    { 100,  91, 168,  86},
    { 102,  95, 127,  85},
    { 100, 154,  93,  92},
    {  96, 162,  95,  96},
    { 100,  92, 125, 133},
    { 112,  89, 147,  91},
    { 113, 146, 108,  81},
    { 100, 160,  95,  94},
    {  99,  93,  88, 167},
    { 119,  87, 113, 132},
    { 131, 133, 121,  80},
    { 111, 154,  98,  87}
},
```

```
[
 [100,  88, 142,  82],
 [103,  96, 121,  86],
 [106, 147, 103,  93],
 [109, 162,  94,  98],
 [100,  93, 134, 128],
 [104,  91, 118, 139],
 [108, 100, 102, 147],
 [110, 105,  93, 147],
 [ 97,  95,  95, 162],
 [ 98,  95,  94, 162],
 [ 98,  94,  95, 162],
 [ 99,  94,  96, 161],
 [ 95,  96,  94, 161],
 [ 95,  96,  95, 161],
 [ 94,  98,  97, 160],
 [ 94,  98,  99, 158]
],
```

FIG. 44

FIG. 45

```
{
    {  96,   94,  131,   88},
    {  99,   90,  105,   90},
    { 103,   98,   97,   89},
    { 132,  153,   97,   75},
    {  95,   95,  138,  123},
    {  98,   90,  116,  128},
    { 111,   78,   93,  125},
    { 146,   93,   81,  106},
    {  96,   95,   95,  162},
    {  97,   93,   95,  163},
    { 101,   87,   95,  161},
    { 116,   78,   93,  152},
    {  96,   95,   92,  163},
    {  97,   95,   94,  161},
    {  96,   94,   95,  161},
    {  99,   91,   96,  159}
},
```

FIG. 46

```
{
  {  95,  94, 157,  87},
  {  95,  94, 144,  88},
  {  93, 129, 123,  91},
  { 111, 168, 104,  86},
  {  94,  98, 151, 113},
  {  93,  98, 150, 113},
  { 100, 114, 140, 102},
  { 167, 134, 102,  62},
  {  94,  97, 100, 158},
  {  91,  98,  99, 161},
  { 142,  83, 101, 124},
  { 220, 100,  95,  44},
  {  95,  97,  90, 166},
  { 103,  91,  89, 162},
  { 184,  62,  84, 116},
  { 229,  94,  92,  46}
},
```

FIG. 47

```
{
    {  98,  85, 120,  89},
    {  99, 102,  89,  95},
    {  98, 157,  94,  94},
    {  97, 164,  96,  95},
    { 103,  86, 147,  96},
    { 110,  91, 109,  89},
    { 108, 139,  94,  87},
    { 103, 156,  95,  90},
    { 106,  89, 107, 149},
    { 119,  80, 103, 135},
    { 125,  86,  81, 120},
    { 117, 100,  77, 105},
    { 103,  93,  91, 162},
    { 112,  86,  92, 158},
    { 119,  81,  89, 154},
    { 121,  81,  80, 146}
},
```

FIG. 48

```
{
    {   96,    91,   157,    93},
    {   96,    86,   142,    95},
    {   96,    91,   120,    93},
    {   97,   118,   103,    91},
    {   97,    96,   164,    93},
    {   96,    95,   163,    93},
    {   95,    92,   161,    94},
    {   96,    91,   149,    93},
    {   96,    96,   133,   124},
    {   95,    97,   150,   108},
    {  100,    93,   161,    95},
    {  121,    83,   159,    86},
    {   98,    93,    84,   170},
    {  115,    83,    95,   152},
    {  162,    60,   112,   113},
    {  197,    50,   125,    84}
},
```

FIG. 49

```
{
  {  101,   85,  109,  107},
  {  109,  118,   66,  115},
  {  109,  157,  104,   91},
  {  101,  141,  137,   78},
  {  111,   92,   79,  139},
  {  139,  122,   76,   96},
  {  126,  134,  142,   62},
  {  105,  113,  164,   71},
  {  124,  107,   77,  132},
  {  158,  115,  116,   54},
  {  127,  107,  164,   52},
  {  102,  101,  166,   77},
  {  126,  117,  105,  100},
  {  147,  108,  143,   40},
  {  120,   98,  163,   57},
  {  101,  100,  158,   82}
},
```

FIG. 50

```
  {
    {   96,    97,   159,    96},
    {   96,   101,   157,    97},
    {   95,   112,   152,    97},
    {   96,   125,   145,    95},
    {   96,   102,   166,    95},
    {   96,   102,   168,    94},
    {   96,   102,   167,    94},
    {   96,   103,   165,    95},
    {   93,   102,   148,   112},
    {   96,   102,   153,   106},
    {   98,   101,   155,   104},
    {   99,   100,   152,   105},
    {  117,    86,    62,   187},
    {  128,    81,    63,   182},
    {  134,    79,    66,   176},
    {  134,    81,    70,   172}
  }
};
```

FIG. 51

```
ALIGN_DATA(MEMORY_ALIGN_DEF_SIZE, const short
mipMatrix8x8[8][16][8]) =
{
  {
    {   94,  127,  110,  101,   89,   97,   97,   98},
    {   94,  124,  130,  102,   96,   95,   96,   97},
    {   93,  109,  138,  106,   96,   96,   96,   97},
    {   94,  103,  126,  122,   96,   97,   96,   97},
    {   94,  130,  119,  103,   96,   94,   94,  100},
    {   93,  118,  133,  104,   97,   95,   95,   97},
    {   92,  112,  135,  107,   96,   97,   96,   97},
    {   92,  105,  136,  110,   96,   98,   96,   97},
    {   94,  130,  120,  104,   96,   97,   92,   97},
    {   93,  119,  133,  103,   97,   97,   94,   96},
    {   91,  110,  136,  107,   97,   97,   96,   97},
    {   91,  106,  133,  112,   96,   98,   96,   97},
    {   94,  127,  119,  104,   96,   97,   99,   94},
    {   93,  120,  130,  104,   97,   97,   97,   94},
    {   91,  111,  133,  108,   97,   97,   97,   96},
    {   91,  106,  129,  114,   96,   98,   96,   97}
  },
```

FIG. 52

```
{
  {  96,  97,  94,  95, 138,  94,  95,  96},
  {  97, 120,  92,  94, 105,  93,  96,  96},
  {  97, 141, 116,  90,  93,  98,  94,  96},
  {  97, 101, 144, 105,  95,  98,  94,  96},
  {  96,  96,  97,  95, 123, 140,  92,  95},
  {  97,  95,  95,  94, 142, 104,  92,  96},
  {  97, 111,  92,  93, 117,  91,  95,  95},
  {  97, 125, 108,  92,  98,  96,  95,  95},
  {  96,  95,  98,  94,  90, 128, 140,  91},
  {  96,  95,  98,  93, 109, 150, 100,  93},
  {  97,  91,  98,  93, 137, 119,  89,  96},
  {  97,  97,  98,  94, 126,  97,  94,  95},
  {  96,  95,  98,  94,  94,  93, 122, 138},
  {  96,  95,  99,  93,  91, 117, 141,  99},
  {  96,  94, 100,  93, 104, 144, 108,  95},
  {  97,  92, 101,  94, 122, 124,  95,  97}
},
```

FIG. 53

```
{
    {  96, 115,  91,  96,  91, 114,  93,  96},
    {  96, 159, 106,  93,  93, 106,  94,  96},
    {  96,  91, 163,  98,  95, 105,  93,  96},
    {  96,  98,  85, 168,  95, 106,  94,  96},
    {  96, 109,  94,  96,  73, 152, 104,  94},
    {  96, 141, 102,  94,  73, 140, 102,  94},
    {  96, 102, 142,  97,  78, 131, 101,  94},
    {  96,  94,  94, 151,  84, 123, 102,  95},
    {  97, 101,  96,  96,  91,  82, 170,  98},
    {  98, 108,  98,  95,  89,  81, 172,  95},
    { 100, 103, 109,  95,  88,  79, 172,  94},
    { 101,  95,  95, 118,  89,  78, 165,  96},
    { 100,  97,  96,  94,  93, 101,  77, 174},
    { 103,  96,  96,  93,  91, 101,  79, 172},
    { 108,  97,  95,  91,  89, 101,  80, 170},
    { 111,  94,  95,  96,  89,  98,  83, 166}
},
```

FIG. 54

```
{
  {  96, 112,  99,  99, 111, 132,  95,  95},
  {  96,  97, 123, 104,  91, 135,  97,  94},
  {  96,  93, 111, 129,  88, 126, 101,  94},
  {  97,  97,  95, 145,  90, 114, 106,  96},
  {  96,  94, 104, 102,  94, 134, 119,  95},
  {  96,  84, 110, 114,  90, 119, 128,  95},
  {  97,  94,  93, 130,  89, 105, 136,  97},
  { 100,  98,  91, 133,  90,  95, 131, 103},
  {  97,  92, 100, 104,  94,  90, 149, 111},
  { 100,  91,  97, 114,  95,  84, 143, 117},
  { 107,  94,  90, 121,  92,  81, 131, 126},
  { 115,  91,  92, 119,  86,  87, 113, 134},
  { 102,  93,  96, 103,  92,  94,  86, 168},
  { 115,  95,  92, 107,  88,  95,  81, 166},
  { 133,  87,  94, 104,  79, 102,  74, 159},
  { 141,  77,  99, 102,  72, 107,  72, 154}
},
```

FIG. 55

```
{
  {   96,  102,   96,   97,  165,  104,   93,   96},
  {   96,  104,  101,   96,  164,  100,   94,   96},
  {   96,  101,  110,   99,  158,   97,   94,   95},
  {   97,   98,   94,  126,  145,   99,   94,   95},
  {   96,   96,   97,   96,   86,  166,  103,   93},
  {   96,   95,   97,   97,   90,  168,   98,   92},
  {   97,   97,   97,   97,   95,  167,   96,   92},
  {   97,   96,   98,  100,  101,  158,   97,   92},
  {   96,   97,   96,   96,   98,   88,  163,  100},
  {   96,   98,   97,   97,   97,   94,  162,   96},
  {   97,   97,   98,   97,   95,  101,  159,   93},
  {   97,   97,   97,  100,   94,  110,  149,   95},
  {   96,   97,   96,   97,   94,   98,   87,  168},
  {   96,   98,   97,   97,   95,   96,   94,  162},
  {   96,   97,   98,   98,   95,   93,  103,  155},
  {   97,   97,   96,  101,   96,   94,  111,  146}
},
```

```
{
  {  96, 116, 112,  95, 102, 140,  90,  96},
  {  97,  83, 126, 114,  89, 114, 115,  95},
  {  97,  94,  84, 138,  93,  93, 118, 115},
  {  98,  99,  87, 120,  95,  89, 105, 140},
  {  97,  89, 102, 103,  92, 103, 147,  99},
  {  99,  92,  89, 111,  95,  87, 121, 138},
  { 101,  99,  86, 102,  95,  91,  94, 165},
  { 102,  96,  97,  93,  94,  95,  91, 167},
  {  98,  96,  91, 101,  96,  89, 105, 156},
  { 102,  97,  92,  96,  94,  95,  82, 175},
  { 104,  96,  97,  91,  93,  97,  82, 175},
  { 104,  96,  98,  91,  92,  97,  87, 169},
  {  99,  96,  94,  97,  95,  97,  84, 171},
  { 102,  95,  97,  94,  93,  97,  85, 170},
  { 104,  96,  97,  93,  93,  98,  86, 169},
  { 104,  96,  97,  94,  93,  98,  88, 165}
},
```

FIG. 56

FIG. 57

```
{
  {  96,  92,  95,  97, 156,  97,  94,  95},
  {  97,  94,  92,  97, 135,  90,  96,  94},
  {  97, 124,  90,  97, 111,  92,  97,  94},
  {  97, 127, 108, 100, 101,  95,  97,  94},
  {  97,  94,  95,  97, 107, 154,  97,  93},
  {  97,  92,  93,  98, 135, 135,  90,  94},
  {  97,  94,  90,  97, 150, 109,  92,  94},
  {  97, 102,  93,  96, 138,  96,  97,  93},
  {  97,  96,  94,  96,  93, 105, 159,  91},
  {  98,  95,  93,  97,  90, 135, 137,  86},
  {  98,  95,  93,  97, 101, 152, 110,  89},
  {  97,  96,  92,  98, 119, 139, 100,  92},
  {  98,  95,  94,  96,  97,  91, 107, 153},
  {  99,  96,  92,  97,  97,  87, 141, 123},
  {  98,  97,  92,  97,  94,  99, 155, 101},
  {  98,  98,  92,  98,  97, 117, 138,  95}
},
```

FIG. 58

```
    {
      {   97,  113,   90,   96,   90,  116,   92,   95},
      {   97,  135,  136,   88,   94,   96,   98,   95},
      {   96,   87,  134,  132,   96,   96,   96,   96},
      {   95,   97,   85,  170,   97,   96,   96,   97},
      {   98,  111,   96,   93,   69,  150,  108,   90},
      {   98,  108,  153,   92,   92,  101,   97,   94},
      {   96,   91,  110,  153,   97,   95,   95,   96},
      {   94,   97,   84,  171,   97,   97,   96,   97},
      {   99,  103,  106,   91,   90,   88,  156,   99},
      {   98,   91,  151,  107,   94,   98,  102,   95},
      {   95,   95,   96,  164,   96,   97,   94,   96},
      {   93,   96,   86,  170,   97,   97,   96,   97},
      {   99,   93,  111,   96,   96,   96,   81,  164},
      {   98,   88,  133,  124,   98,   97,   92,  108},
      {   95,   97,   95,  163,   96,   97,   96,   95},
      {   93,   97,   89,  167,   97,   97,   96,   99}
    }
  };
```

FIG. 59

```
ALIGN_DATA(MEMORY_ALIGN_DEF_SIZE, const short mipMatrix16x16[6][64][7])=
{
  {
    { 103,  94,  95, 131,  97,  98,  96},
    { 135,  96,  96, 106, 103,  97,  95},
    { 164,  88,  95,  99, 103,  97,  95},
    { 139, 128,  88,  96, 102,  98,  96},
    {  96, 163,  90,  93, 101,  99,  96},
    {  86, 142, 119,  93, 100,  99,  95},
    {  95, 100, 154,  95,  99,  99,  96},
    {  99,  86, 164,  97,  97, 100,  97},
    { 111,  93,  96, 137, 118,  96,  95},
    { 135,  99,  95, 124, 114,  99,  94},
    { 150,  96,  93, 109, 113, 101,  94},
    { 129, 128,  89,  98, 110, 103,  94},
    {  97, 150,  95,  92, 107, 104,  94},
    {  91, 129, 124,  91, 103, 105,  94},
    {  97,  97, 151,  93, 100, 105,  95},
    { 101,  86, 158,  96,  97, 105,  97},
    { 105,  96,  96, 109, 148,  96,  96},
    { 119,  95,  96, 114, 134, 104,  94},
    { 126, 102,  94, 109, 126, 108,  93},
    { 117, 120,  94, 100, 119, 111,  93},
    { 102, 127, 103,  93, 113, 114,  92},
    {  99, 113, 124,  91, 107, 115,  93},
    { 102,  94, 143,  92, 102, 114,  95},
    { 103,  88, 147,  94,  99, 112,  98},
    {  99,  98,  96,  93, 139, 121,  93},
    { 103, 100,  96,  99, 132, 123,  93},
    { 105, 104,  97, 100, 125, 125,  92},
    { 105, 108, 100,  97, 118, 127,  92},
    { 106, 107, 108,  94, 113, 128,  93},
    { 106,  99, 120,  92, 108, 127,  94},
    { 106,  93, 129,  91, 104, 124,  97},
    { 106,  92, 132,  92, 101, 120, 100},
    {  97,  98,  97,  95, 105, 152,  94},
    {  95, 100,  97,  95, 108, 148,  95},
    {  95, 102,  99,  96, 107, 147,  94},
    {  99,  99, 103,  96, 105, 146,  95},
    { 105,  95, 108,  96, 103, 145,  95},
    { 108,  93, 113,  94, 101, 142,  97},
    { 108,  94, 116,  93, 100, 137, 100},
    { 107,  95, 118,  93,  99, 130, 104},
    {  96,  97,  97,  98,  89, 149, 112},
    {  94,  98,  98,  97,  89, 152, 107},
    {  94,  98, 100,  98,  89, 155, 105},
    {  97,  95, 102,  98,  89, 154, 104},
    { 102,  92, 105,  98,  90, 152, 104},
    { 106,  92, 106,  97,  90, 150, 105},
    { 107,  94, 107,  95,  91, 144, 107},
    { 106,  95, 109,  95,  93, 136, 111},
    {  96,  97,  97,  97,  90, 118, 143},
    {  96,  96,  98,  99,  84, 132, 132},
    {  96,  95,  99, 100,  81, 140, 126},
    {  98,  94, 101, 100,  81, 144, 122},
    { 101,  92, 101, 100,  82, 143, 122},
    { 103,  93, 101,  99,  84, 142, 121},
    { 104,  95, 101,  98,  86, 139, 122},
    { 104,  96, 103,  97,  89, 133, 123},
    {  97,  95,  98,  97,  93,  95, 162},
    {  98,  94,  99,  98,  87, 110, 152},
    {  99,  94,  99, 100,  84, 119, 146},
    {  99,  94,  99, 100,  82, 124, 141},
    { 100,  94,  99, 100,  82, 125, 139},
    { 102,  95,  99, 100,  83, 126, 137},
    { 103,  95,  99,  99,  85, 125, 136},
    { 103,  96, 101,  98,  88, 123, 134}
  },
```

FIG. 60

```
[
  [ 108,  97,  99, 134, 106, 101,  97],
  [ 107, 102, 100, 111, 120, 104,  97],
  [ 101, 107, 102, 101, 124, 106,  98],
  [  98, 107, 105,  98, 123, 108,  99],
  [  99, 104, 108,  97, 121, 109,  99],
  [ 100, 102, 111,  97, 119, 110,  99],
  [  98, 103, 113,  97, 118, 110,  99],
  [  97, 101, 117,  97, 115, 110,  99],
  [ 100,  99, 100, 110, 135, 103,  98],
  [  92, 102, 102,  97, 134, 113,  98],
  [  86, 101, 104,  94, 131, 117,  99],
  [  89,  95, 107,  94, 130, 118, 100],
  [  97,  88, 108,  95, 129, 118, 100],
  [ 100,  91, 104,  95, 129, 117, 101],
  [  98,  99,  99,  95, 128, 117, 100],
  [  97, 102, 100,  96, 125, 115, 100],
  [  94,  98, 100,  94, 140, 110,  99],
  [  92,  97, 103,  93, 129, 121,  99],
  [  92,  95, 104,  93, 125, 123, 101],
  [  93,  94, 104,  94, 125, 122, 102],
  [  94,  94, 103,  94, 127, 120, 102],
  [  95,  95, 102,  94, 129, 118, 102],
  [  96,  96, 101,  95, 129, 117, 101],
  [  96,  98, 101,  95, 128, 116, 101],
  [  95,  96, 100,  93, 127, 124,  99],
  [  94,  95, 102,  94, 122, 125, 103],
  [  94,  94, 103,  94, 121, 124, 104],
  [  94,  95, 103,  93, 123, 122, 105],
  [  94,  96, 102,  93, 125, 120, 105],
  [  94,  96, 102,  93, 127, 119, 103],
  [  95,  95, 102,  93, 128, 119, 102],
  [  96,  96, 103,  94, 126, 118, 102],
  [  96,  95, 100,  95, 113, 135, 102],
  [  94,  95, 102,  94, 119, 124, 107],
  [  94,  95, 102,  93, 120, 123, 108],
  [  94,  95, 103,  93, 121, 122, 107],
  [  94,  95, 103,  92, 123, 121, 106],
  [  95,  95, 103,  92, 124, 122, 104],
  [  95,  95, 103,  93, 123, 123, 102],
  [  96,  96, 103,  93, 122, 123, 102],
  [  95,  96, 100,  95, 106, 130, 114],
  [  94,  96, 101,  93, 115, 125, 111],
  [  94,  95, 102,  93, 117, 124, 109],
  [  95,  95, 103,  93, 118, 124, 107],
  [  95,  95, 103,  93, 118, 126, 106],
  [  95,  94, 104,  93, 117, 127, 104],
  [  96,  94, 104,  93, 117, 128, 103],
  [  96,  96, 104,  94, 116, 127, 102],
  [  95,  96,  99,  94, 104, 115, 131],
  [  94,  96, 101,  93, 110, 126, 115],
  [  94,  96, 102,  92, 114, 128, 109],
  [  95,  95, 103,  93, 115, 128, 107],
  [  95,  95, 103,  93, 114, 129, 106],
  [  96,  94, 104,  94, 113, 130, 105],
  [  96,  93, 105,  94, 113, 130, 104],
  [  97,  95, 105,  95, 112, 128, 104],
  [  96,  96,  99,  95, 102, 107, 139],
  [  95,  96, 101,  94, 106, 123, 120],
  [  95,  96, 102,  93, 110, 128, 112],
  [  95,  96, 102,  93, 112, 128, 109],
  [  96,  95, 103,  94, 112, 128, 108],
  [  96,  94, 105,  94, 111, 129, 107],
  [  97,  93, 106,  95, 110, 128, 106],
  [  97,  94, 106,  96, 110, 126, 106]
],
```

FIG. 61

```
{
  { 107,  95,  95, 114, 104,  96,  97},
  { 133,  94,  95,  88, 109,  99,  97},
  { 151, 100,  94,  83, 105, 101,  98},
  { 137, 126,  92,  82, 103, 101, 100},
  { 109, 153,  94,  83, 100, 100, 101},
  {  92, 154, 109,  82,  98,  99, 103},
  {  93, 117, 146,  84,  96,  95, 107},
  { 104,  65, 187,  89,  93,  86, 115},
  { 114,  95,  95, 101, 126,  99,  97},
  { 135,  96,  94,  76, 118, 109,  97},
  { 147, 105,  93,  66, 111, 113,  99},
  { 137, 126,  92,  65, 105, 111, 103},
  { 113, 150,  94,  67, 100, 107, 108},
  {  94, 156, 107,  71,  96, 101, 114},
  {  94, 121, 143,  76,  92,  92, 121},
  { 105,  65, 189,  83,  90,  77, 133},
  { 112,  96,  95,  82, 137, 110,  97},
  { 134,  97,  94,  65, 117, 125,  98},
  { 147, 104,  93,  56, 106, 125, 104},
  { 138, 124,  92,  55,  99, 120, 111},
  { 116, 148,  94,  57,  94, 110, 120},
  {  97, 156, 107,  63,  90,  98, 130},
  {  96, 122, 143,  71,  87,  82, 142},
  { 107,  63, 190,  79,  85,  64, 155},
  { 110,  97,  95,  74, 123, 133,  97},
  { 132,  99,  94,  58, 111, 134, 104},
  { 146, 105,  93,  49, 103, 127, 115},
  { 140, 123,  93,  48,  95, 117, 126},
  { 119, 147,  94,  51,  89, 103, 139},
  {  99, 156, 106,  58,  85,  86, 152},
  {  96, 123, 142,  67,  81,  65, 167},
  { 107,  64, 191,  76,  80,  47, 180},
  { 109,  97,  96,  73, 106, 145, 105},
  { 130,  99,  94,  52, 107, 130, 119},
  { 145, 105,  93,  43, 101, 117, 133},
  { 140, 123,  93,  43,  93, 103, 147},
  { 121, 146,  94,  47,  86,  85, 163},
  { 101, 156, 106,  55,  81,  65, 179},
  {  97, 123, 142,  64,  77,  45, 194},
  { 107,  64, 191,  72,  75,  30, 204},
  { 109,  97,  96,  74,  99, 134, 125},
  { 128,  99,  94,  52, 102, 116, 141},
  { 143, 106,  93,  41,  98,  98, 158},
  { 140, 124,  92,  42,  90,  80, 174},
  { 122, 146,  94,  47,  83,  61, 192},
  { 102, 154, 107,  53,  79,  42, 207},
  {  98, 123, 143,  60,  75,  25, 219},
  { 108,  66, 190,  69,  71,  16, 224},
  { 108,  97,  96,  76,  96, 103, 157},
  { 126, 101,  95,  57,  96,  88, 172},
  { 139, 109,  94,  46,  92,  71, 189},
  { 137, 125,  93,  46,  65,  55, 204},
  { 121, 144,  96,  48,  79,  38, 219},
  { 104, 150, 109,  53,  75,  23, 231},
  { 100, 119, 144,  59,  71,  11, 240},
  { 107,  67, 189,  66,  67,   7, 240},
  { 108,  98,  97,  79,  95,  67, 190},
  { 122, 102,  96,  63,  90,  58, 203},
  { 133, 111,  95,  54,  86,  47, 215},
  { 131, 125,  96,  51,  81,  35, 226},
  { 119, 139, 101,  51,  76,  23, 237},
  { 107, 141, 115,  54,  72,  12, 245},
  { 103, 114, 147,  58,  68,   5, 250},
  { 108,  68, 187,  65,  64,   4, 248}
},
```

FIG. 62

```
[
  [  98,  96,  96, 151,  94,  96,  96],
  [ 116,  93,  96, 143,  98,  95,  97],
  [ 144,  91,  96, 139, 100,  94,  97],
  [ 144, 110,  93, 135, 102,  93,  98],
  [ 113, 143,  89, 130, 105,  92,  98],
  [  95, 144, 104, 124, 107,  91,  98],
  [  99, 107, 139, 118, 110,  90,  98],
  [ 105,  80, 161, 112, 112,  92,  98],
  [ 102,  96,  96, 145, 127,  90,  98],
  [ 105,  97,  96, 143, 130,  88,  98],
  [ 115,  96,  96, 138, 135,  86,  99],
  [ 121,  99,  96, 133, 138,  86,  99],
  [ 116, 110,  95, 127, 142,  85,  99],
  [ 108, 115, 100, 122, 144,  85,  99],
  [ 106, 104, 115, 116, 143,  88,  98],
  [ 106,  90, 130, 111, 139,  91,  99],
  [  98,  97,  96, 102, 162,  90,  98],
  [  98,  98,  96, 102, 161,  92,  98],
  [  98,  98,  96, 101, 161,  93,  98],
  [ 101,  97,  97, 100, 160,  96,  98],
  [ 105,  97,  97, 100, 157, 100,  97],
  [ 106,  99,  97, 100, 153, 104,  96],
  [ 105, 100, 100, 100, 148, 109,  96],
  [ 104,  96, 107, 101, 141, 111,  97],
  [  97,  97,  96,  89, 139, 125,  94],
  [  97,  97,  96,  91, 135, 129,  94],
  [  96,  97,  96,  91, 130, 134,  94],
  [  97,  96,  96,  93, 125, 138,  93],
  [ 100,  95,  96,  95, 120, 143,  93],
  [ 102,  96,  96,  97, 115, 146,  94],
  [ 102,  97,  96,  98, 113, 145,  96],
  [ 102,  97,  99,  98, 113, 139, 101],
  [  97,  96,  96,  95, 100, 158,  96],
  [  97,  96,  96,  96,  98, 156,  99],
  [  97,  96,  96,  97,  95, 156, 102],
  [  98,  96,  96,  97,  93, 156, 104],
  [  99,  96,  96,  98,  91, 154, 107],
  [  99,  96,  95,  99,  91, 151, 111],
  [  99,  97,  95,  98,  93, 145, 115],
  [ 100,  97,  96,  98,  96, 137, 119],
  [  97,  96,  96,  97,  89, 140, 122],
  [  98,  96,  96,  99,  90, 135, 127],
  [  98,  96,  95,  98,  90, 130, 132],
  [  99,  96,  95,  98,  90, 126, 136],
  [  98,  97,  95,  99,  90, 122, 140],
  [  98,  97,  94,  98,  90, 119, 143],
  [  99,  97,  94,  97,  92, 116, 145],
  [  99,  97,  95,  97,  94, 114, 145],
  [  96,  97,  95,  96,  94, 104, 155],
  [  97,  97,  95,  96,  94, 101, 158],
  [  98,  97,  95,  97,  94,  99, 160],
  [  98,  97,  95,  97,  93,  97, 162],
  [  98,  98,  95,  97,  93,  96, 164],
  [  98,  97,  95,  97,  93,  95, 164],
  [  99,  97,  95,  97,  93,  96, 164],
  [  99,  97,  96,  97,  94,  97, 161],
  [  97,  96,  96,  96,  96,  87, 169],
  [  97,  97,  95,  95,  96,  88, 169],
  [  98,  97,  95,  96,  95,  88, 169],
  [  98,  98,  95,  96,  95,  87, 170],
  [  99,  98,  95,  97,  95,  87, 170],
  [  99,  98,  95,  97,  95,  87, 170],
  [  99,  97,  96,  97,  95,  88, 169],
  [  99,  97,  97,  97,  95,  90, 167]
],
```

FIG. 63

```
[
  [ 111,  94,  95, 135, 100,  93,  97],
  [ 138,  94,  95, 106, 114,  90,  98],
  [ 136, 115,  94,  93, 115,  93,  97],
  [ 103, 143,  97,  90, 109,  99,  96],
  [  87, 136, 118,  90, 102, 104,  95],
  [  92, 103, 146,  92,  97, 106,  98],
  [  98,  84, 157,  93,  93, 105, 105],
  [  99,  84, 150,  94,  91, 102, 115],
  [ 111,  98,  96, 123, 138,  84,  99],
  [ 110, 111,  97, 100, 139,  92,  97],
  [  95, 125, 103,  99, 125, 106,  95],
  [  88, 118, 119,  88, 107, 117,  97],
  [  93,  96, 137,  91,  95, 119, 103],
  [  98,  82, 144,  93,  90, 115, 113],
  [  99,  82, 136,  93,  98, 108, 125],
  [  98,  88, 128,  94,  90, 101, 135],
  [  95, 104,  98,  91, 156,  99,  96],
  [  90, 110, 104,  91, 128, 122,  93],
  [  88, 105, 114,  93, 104, 134,  97],
  [  93,  91, 125,  95,  91, 131, 109],
  [  99,  82, 128,  96,  87, 121, 124],
  [  99,  83, 123,  96,  87, 110, 137],
  [  97,  89, 116,  95,  99, 101, 147],
  [  96,  93, 111,  94,  91,  97, 151],
  [  92, 100, 101,  90, 117, 144,  90],
  [  91,  98, 108,  96,  95, 149, 100],
  [  94,  91, 114,  99,  86, 136, 118],
  [  97,  86, 116,  99,  87, 118, 135],
  [  99,  86, 113,  97,  89, 104, 149],
  [  98,  88, 109,  97,  91,  96, 157],
  [  96,  94, 104,  96,  92,  93, 161],
  [  95,  96, 103,  94,  94,  92, 159],
  [  95,  95, 102,  98,  98, 155, 105],
  [  95,  92, 106,  99,  86, 131, 128],
  [  97,  89, 108,  99,  89, 109, 147],
  [  97,  89, 107,  98,  92,  95, 159],
  [  97,  91, 104,  97,  94,  89, 165],
  [  96,  93, 102,  96,  95,  87, 167],
  [  95,  95, 100,  95,  95,  87, 167],
  [  94,  96, 100,  94,  96,  89, 163],
  [  96,  94, 101,  98,  89, 122, 138],
  [  96,  91, 104,  97,  93,  99, 156],
  [  97,  90, 104,  97,  95,  88, 165],
  [  97,  91, 103,  96,  96,  84, 169],
  [  96,  94, 100,  96,  96,  84, 170],
  [  95,  95,  99,  96,  97,  84, 170],
  [  94,  96,  98,  95,  98,  85, 169],
  [  94,  97,  99,  94,  97,  88, 165],
  [  96,  93, 100,  96,  96,  92, 163],
  [  97,  91, 102,  96,  97,  85, 169],
  [  97,  92, 101,  96,  98,  82, 171],
  [  96,  93, 100,  96,  98,  82, 171],
  [  95,  95,  99,  95,  98,  83, 171],
  [  95,  96,  98,  95,  98,  84, 170],
  [  94,  97,  98,  94,  98,  85, 168],
  [  95,  97,  98,  94,  98,  88, 164],
  [  96,  93, 100,  96,  98,  84, 169],
  [  96,  93, 100,  96,  98,  83, 170],
  [  96,  94,  99,  95,  98,  84, 169],
  [  95,  95,  99,  95,  97,  85, 168],
  [  95,  95,  99,  95,  97,  85, 167],
  [  95,  96,  98,  95,  98,  86, 166],
  [  94,  97,  98,  94,  98,  87, 165],
  [  95,  97,  99,  95,  98,  89, 162]
],
```

FIG. 64

```
{
  {  96,  96,  96, 138,  94,  97,  96},
  { 103,  95,  95, 117,  97,  96,  95},
  { 125,  93,  96, 105,  98,  96,  96},
  { 141,  99,  94, 100,  97,  97,  96},
  { 132, 122,  92,  98,  97,  97,  96},
  { 108, 145,  95,  97,  97,  96,  96},
  {  95, 135, 118,  97,  97,  96,  95},
  {  98, 100, 151,  97,  97,  96,  95},
  { 100,  96,  96, 147, 111,  94,  96},
  {  98,  97,  95, 142, 103,  96,  95},
  { 102,  96,  95, 128, 100,  96,  95},
  { 118,  94,  96, 115,  99,  97,  95},
  { 134,  97,  95, 107,  98,  97,  95},
  { 129, 116,  92, 102,  98,  97,  95},
  { 112, 134,  97,  99,  98,  97,  95},
  { 102, 126, 116,  98,  98,  96,  95},
  {  98,  96,  96, 118, 145,  91,  96},
  {  98,  96,  96, 133, 127,  93,  95},
  {  97,  97,  96, 136, 115,  94,  95},
  { 103,  95,  96, 130, 107,  96,  95},
  { 116,  93,  96, 122, 103,  97,  95},
  { 126,  98,  95, 113, 100,  97,  94},
  { 124, 112,  93, 106, 100,  97,  95},
  { 114, 121, 100, 102, 100,  97,  95},
  {  96,  97,  96,  96, 149, 110,  93},
  {  97,  97,  96, 108, 146, 100,  94},
  {  97,  97,  96, 119, 139,  95,  95},
  {  98,  97,  96, 126, 128,  94,  95},
  { 103,  95,  96, 127, 118,  95,  95},
  { 112,  94,  96, 122, 111,  95,  95},
  { 118,  99,  95, 115, 107,  96,  95},
  { 117, 108,  97, 109, 105,  97,  95},
  {  96,  97,  96,  95, 118, 146,  90},
  {  96,  97,  96,  97, 135, 127,  91},
  {  96,  97,  95, 102, 144, 111,  93},
  {  96,  97,  95, 110, 143, 101,  94},
  {  98,  97,  95, 117, 137,  96,  95},
  { 102,  96,  96, 120, 128,  95,  95},
  { 108,  96,  95, 119, 120,  95,  95},
  { 112, 100,  96, 114, 114,  97,  95},
  {  96,  97,  96,  98,  94, 154, 102},
  {  97,  97,  96,  97, 108, 150,  94},
  {  96,  97,  95,  97, 124, 137,  91},
  {  96,  97,  95,  99, 137, 121,  92},
  {  96,  96,  96, 105, 141, 109,  93},
  {  98,  96,  96, 111, 139, 102,  94},
  { 101,  96,  96, 114, 132,  99,  94},
  { 105,  98,  96, 115, 123,  99,  95},
  {  97,  96,  96,  98,  94, 120, 137},
  {  96,  96,  95,  98,  97, 136, 119},
  {  96,  97,  95,  98, 105, 142, 105},
  {  96,  97,  95,  97, 118, 137,  97},
  {  95,  97,  95,  99, 129, 127,  94},
  {  96,  97,  95, 103, 135, 117,  94},
  {  98,  97,  96, 107, 134, 109,  94},
  { 100,  98,  96, 110, 128, 106,  95},
  {  96,  96,  96,  95, 101,  85, 166},
  {  96,  97,  95,  97, 101, 101, 150},
  {  96,  97,  95,  98, 102, 117, 132},
  {  96,  97,  95,  98, 107, 128, 116},
  {  96,  97,  95,  98, 115, 130, 106},
  {  96,  97,  95, 100, 123, 125, 101},
  {  97,  97,  96, 103, 126, 119,  99},
  {  98,  98,  97, 105, 126, 113,  99}
 }
};
```

IMAGE PROCESSING DEVICE AND IMAGE PROCESSING METHOD

CROSS-REFERENCE TO RELATED APPLICATIONS

The present application is based on PCT filing PCT/JP2020/047393, filed Dec. 18, 2020, which claims priority to U.S. Provisional Application No. 62/951,177 filed Dec. 20, 2019, the entire contents of each are incorporated herein by reference.

TECHNICAL FIELD

The present technology relates to an image processing device and an image processing method, and particularly relates to, for example, an image processing device and an image processing method that enable simplification of processing.

BACKGROUND ART

In the Joint Video Experts Team (JVET), which is a joint standardization organization of ITU-T and ISO/IEC, standardization work of Versatile Video Coding (VVC), which is a next-generation image encoding system, is in progress for the purpose of further improving encoding efficiency over H.265/HEVC.

In the standardization work of VVC, it has been proposed to perform matrix-based intra prediction (MIP), which is intra prediction using matrix operation, on a prediction block (see, for example, Non Patent Document 1).

In the MIP, parameters of a matrix (weight matrix) obtained by parameter learning are defined, and an operation using (the parameters of) the matrix is performed.

CITATION LIST

Non Patent Document

Non Patent Document 1: Benjamin Bross, Jianle Chen, Shan Liu, Versatile Video Coding (Draft 7), JVET-P2001-v14 (version 14—date Nov. 14, 2019)

SUMMARY OF THE INVENTION

Problems to be Solved by the Invention

An MIP operation (operation performed by the MIP) is performed using an offset factor fO. The offset factor fO is changed according to MipSizeId representing the matrix size of the matrix and modeId representing the mode number of the MIP in order to increase bit accuracy.

As described above, in the MIP operation, since the offset factor fO is changed according to the MipSizeId and the modeId, it is necessary to set the offset factor fO for each combination of the MipSizeId and the modeId, and the process becomes complicated.

The present technology has been made in view of such a situation, and enables simplification of processing.

Solutions to Problems

A first image processing device of the present technology is an image processing device including an intra prediction unit that, when performing matrix-based intra prediction that is intra prediction using a matrix operation on a current prediction block to be encoded, performs the matrix-based intra prediction using a coefficient related to a sum of change amounts of pixel values and set to a fixed value, and generates a predicted image of the current prediction block, and an encoding unit that encodes the current prediction block using the predicted image generated by the intra prediction unit.

A first image processing method of the present technology is an image processing method including an intra prediction step of, when performing matrix-based intra prediction that is intra prediction using a matrix operation on a current prediction block to be encoded, performing the matrix-based intra prediction using a coefficient related to a sum of change amounts of pixel values and set to a fixed value, and generating a predicted image of the current prediction block, and an encoding step of encoding the current prediction block using the predicted image generated in the intra prediction step.

In the first image processing device and image processing method of the present technology, when performing matrix-based intra prediction that is intra prediction using a matrix operation on a current prediction block to be encoded, the matrix-based intra prediction is performed using a coefficient related to a sum of change amounts of pixel values and set to a fixed value, and a predicted image of the current prediction block is generated. Then, the current prediction block is encoded using the predicted image.

A second image processing device of the present technology is an image processing device including an intra prediction unit that, when performing matrix-based intra prediction that is intra prediction using a matrix operation on a current prediction block to be decoded, performs the matrix-based intra prediction using a coefficient related to a sum of change amounts of pixel values and set to a fixed value, and generates a predicted image of the current prediction block, and a decoding unit that decodes the current prediction block using the predicted image generated by the intra prediction unit.

A second image processing method of the present technology is an image processing method including an intra prediction step of, when performing matrix-based intra prediction that is intra prediction using a matrix operation on a current prediction block to be decoded, performing the matrix-based intra prediction using a coefficient related to a sum of change amounts of pixel values and set to a fixed value, and generating a predicted image of the current prediction block, and a decoding step of decoding the current prediction block using the predicted image generated in the intra prediction step.

In the second image processing device and image processing method of the present technology, when performing matrix-based intra prediction that is intra prediction using a matrix operation on a current prediction block to be decoded, the matrix-based intra prediction is performed using a coefficient related to a sum of change amounts of pixel values and set to a fixed value, and a predicted image of the current prediction block is generated. Then, the current prediction block is decoded using the predicted image.

Note that the image processing device may be an independent device or an internal block constituting one device.

Furthermore, the image processing device can be achieved by causing a computer to execute a program. The program can be provided by transmitting via a transmission medium or by recording on a recording medium.

BRIEF DESCRIPTION OF DRAWINGS

FIG. 1 is a diagram describing a first MIP method.

FIG. 3 is a diagram describing MIP in a case where 48 is employed as a fixed offset coefficient and five is employed as a fixed shift amount.

FIG. 4 is a diagram illustrating a weight matrix mWeight[i][j] of (M, m)=(0, 0) in the case where 48 is employed as the fixed offset coefficient and five is employed as the fixed shift amount.

FIG. 5 is a diagram illustrating the weight matrix mWeight[i][j] of (M, m)=(0, 1) in the case where 48 is employed as the fixed offset coefficient and five is employed as the fixed shift amount.

FIG. 6 is a diagram illustrating the weight matrix mWeight[i][j] of (M, m)=(0, 2) in the case where 48 is employed as the fixed offset coefficient and five is employed as the fixed shift amount.

FIG. 7 is a diagram illustrating the weight matrix mWeight[i][j] of (M, m)=(0, 3) in the case where 48 is employed as the fixed offset coefficient and five is employed as the fixed shift amount.

FIG. 8 is a diagram illustrating the weight matrix mWeight[i][j] of (M, m)=(0, 4) in the case where 48 is employed as the fixed offset coefficient and five is employed as the fixed shift amount.

FIG. 9 is a diagram illustrating the weight matrix mWeight[i][j] of (M, m)=(0, 5) in the case where 48 is employed as the fixed offset coefficient and five is employed as the fixed shift amount.

FIG. 10 is a diagram illustrating the weight matrix mWeight[i][j] of (M, m)=(0, 6) in the case where 48 is employed as the fixed offset coefficient and five is employed as the fixed shift amount.

FIG. 11 is a diagram illustrating the weight matrix mWeight[i][j] of (M, m)=(0, 7) in the case where 48 is employed as the fixed offset coefficient and five is employed as the fixed shift amount.

FIG. 12 is a diagram illustrating the weight matrix mWeight[i][j] of (M, m)=(0, 8) in the case where 48 is employed as the fixed offset coefficient and five is employed as the fixed shift amount.

FIG. 13 is a diagram illustrating the weight matrix mWeight[i][j] of (M, m)=(0, 9) in the case where 48 is employed as the fixed offset coefficient and five is employed as the fixed shift amount.

FIG. 14 is a diagram illustrating the weight matrix mWeight[i][j] of (M, m)=(0, 10) in the case where 48 is employed as the fixed offset coefficient and five is employed as the fixed shift amount.

FIG. 15 is a diagram illustrating the weight matrix mWeight[i][j] of (M, m)=(0, 11) in the case where 48 is employed as the fixed offset coefficient and five is employed as the fixed shift amount.

FIG. 16 is a diagram illustrating the weight matrix mWeight[i][j] of (M, m)=(0, 12) in the case where 48 is employed as the fixed offset coefficient and five is employed as the fixed shift amount.

FIG. 17 is a diagram illustrating the weight matrix mWeight[i][j] of (M, m)=(0, 13) in the case where 48 is employed as the fixed offset coefficient and five is employed as the fixed shift amount.

FIG. 18 is a diagram illustrating the weight matrix mWeight[i][j] of (M, m)=(0, 14) in the case where 48 is employed as the fixed offset coefficient and five is employed as the fixed shift amount.

FIG. 19 is a diagram illustrating the weight matrix mWeight[i][j] of (M, m)=(0, 15) in the case where 48 is employed as the fixed offset coefficient and five is employed as the fixed shift amount.

FIG. 20 is a diagram illustrating the weight matrix mWeight[i][j] of (M, m)=(1, 0) in the case where 48 is employed as the fixed offset coefficient and five is employed as the fixed shift amount.

FIG. 21 is a diagram illustrating the weight matrix mWeight[i][j] of (M, m)=(1, 1) in the case where 48 is employed as the fixed offset coefficient and five is employed as the fixed shift amount.

FIG. 22 is a diagram illustrating the weight matrix mWeight[i][j] of (M, m)=(1, 2) in the case where 48 is employed as the fixed offset coefficient and five is employed as the fixed shift amount.

FIG. 23 is a diagram illustrating the weight matrix mWeight[i][j] of (M, m)=(1, 3) in the case where 48 is employed as the fixed offset coefficient and five is employed as the fixed shift amount.

FIG. 24 is a diagram illustrating the weight matrix mWeight[i][j] of (M, m)=(1, 4) in the case where 48 is employed as the fixed offset coefficient and five is employed as the fixed shift amount.

FIG. 25 is a diagram illustrating the weight matrix mWeight[i][j] of (M, m)=(1, 5) in the case where 48 is employed as the fixed offset coefficient and five is employed as the fixed shift amount.

FIG. 26 is a diagram illustrating the weight matrix mWeight[i][j] of (M, m)=(1, 6) in the case where 48 is employed as the fixed offset coefficient and five is employed as the fixed shift amount.

FIG. 27 is a diagram illustrating the weight matrix mWeight[i][j] of (M, m)=(1, 7) in the case where 48 is employed as the fixed offset coefficient and five is employed as the fixed shift amount.

FIG. 28 is a diagram illustrating the weight matrix mWeight[i][j] of (M, m)=(2, 0) in the case where 48 is employed as the fixed offset coefficient and five is employed as the fixed shift amount.

FIG. 29 is a diagram illustrating the weight matrix mWeight[i][j] of (M, m)=(2, 1) in the case where 48 is employed as the fixed offset coefficient and five is employed as the fixed shift amount.

FIG. 30 is a diagram illustrating the weight matrix mWeight[i][j] of (M, m)=(2, 2) in the case where 48 is employed as the fixed offset coefficient and five is employed as the fixed shift amount.

FIG. 31 is a diagram illustrating the weight matrix mWeight[i][j] of (M, m)=(2, 3) in the case where 48 is employed as the fixed offset coefficient and five is employed as the fixed shift amount.

FIG. 32 is a diagram illustrating the weight matrix mWeight[i][j] of (M, m)=(2, 4) in the case where 48 is employed as the fixed offset coefficient and five is employed as the fixed shift amount.

FIG. 33 is a diagram illustrating the weight matrix mWeight[i][j] of (M, m)=(2, 5) in the case where 48 is employed as the fixed offset coefficient and five is employed as the fixed shift amount.

FIG. 34 is a diagram describing MIP in a case where 96 is employed as the fixed offset coefficient and six is employed as the fixed shift amount.

FIG. 35 is a diagram illustrating the weight matrix mWeight[i][j] of (M, m)=(0, 0) in a case where 96 is employed as the fixed offset coefficient and six is employed as the fixed shift amount.

FIG. 36 is a diagram illustrating the weight matrix mWeight[i][j] of (M, m)=(0, 1) in a case where 96 is employed as the fixed offset coefficient and six is employed as the fixed shift amount.

FIG. 37 is a diagram illustrating the weight matrix mWeight[i][j] of (M, m)=(0, 2) in a case where 96 is employed as the fixed offset coefficient and six is employed as the fixed shift amount.

FIG. 38 is a diagram illustrating the weight matrix mWeight[i][j] of (M, m)=(0, 3) in a case where 96 is employed as the fixed offset coefficient and six is employed as the fixed shift amount.

FIG. 39 is a diagram illustrating the weight matrix mWeight[i][j] of (M, m)=(0, 4) in a case where 96 is employed as the fixed offset coefficient and six is employed as the fixed shift amount.

FIG. 40 is a diagram illustrating the weight matrix mWeight[i][j] of (M, m)=(0, 5) in a case where 96 is employed as the fixed offset coefficient and six is employed as the fixed shift amount.

FIG. 41 is a diagram illustrating the weight matrix mWeight[i][j] of (M, m)=(0, 6) in a case where 96 is employed as the fixed offset coefficient and six is employed as the fixed shift amount.

FIG. 42 is a diagram illustrating the weight matrix mWeight[i][j] of (M, m)=(0, 7) in a case where 96 is employed as the fixed offset coefficient and six is employed as the fixed shift amount.

FIG. 43 is a diagram illustrating the weight matrix mWeight[i][j] of (M, m)=(0, 8) in a case where 96 is employed as the fixed offset coefficient and six is employed as the fixed shift amount.

FIG. 44 is a diagram illustrating the weight matrix mWeight[i][j] of (M, m)=(0, 9) in a case where 96 is employed as the fixed offset coefficient and six is employed as the fixed shift amount.

FIG. 45 is a diagram illustrating the weight matrix mWeight[i][j] of (M, m)=(0, 10) in a case where 96 is employed as the fixed offset coefficient and six is employed as the fixed shift amount.

FIG. 46 is a diagram illustrating the weight matrix mWeight[i][j] of (M, m)=(0, 11) in a case where 96 is employed as the fixed offset coefficient and six is employed as the fixed shift amount.

FIG. 47 is a diagram illustrating the weight matrix mWeight[i][j] of (M, m)=(0, 12) in a case where 96 is employed as the fixed offset coefficient and six is employed as the fixed shift amount.

FIG. 48 is a diagram illustrating the weight matrix mWeight[i][j] of (M, m)=(0, 13) in a case where 96 is employed as the fixed offset coefficient and six is employed as the fixed shift amount.

FIG. 49 is a diagram illustrating the weight matrix mWeight[i][j] of (M, m)=(0, 14) in a case where 96 is employed as the fixed offset coefficient and six is employed as the fixed shift amount.

FIG. 50 is a diagram illustrating the weight matrix mWeight[i][j] of (M, m)=(0, 15) in a case where 96 is employed as the fixed offset coefficient and six is employed as the fixed shift amount.

FIG. 51 is a diagram illustrating the weight matrix mWeight[i][j] of (M, m)=(1, 0) in a case where 96 is employed as the fixed offset coefficient and six is employed as the fixed shift amount.

FIG. 52 is a diagram illustrating the weight matrix mWeight[i][j] of (M, m)=(1, 1) in a case where 96 is employed as the fixed offset coefficient and six is employed as the fixed shift amount.

FIG. 53 is a diagram illustrating the weight matrix mWeight[i][j] of (M, m)=(1, 2) in a case where 96 is employed as the fixed offset coefficient and six is employed as the fixed shift amount.

FIG. 54 is a diagram illustrating the weight matrix mWeight[i][j] of (M, m)=(1, 3) in a case where 96 is employed as the fixed offset coefficient and six is employed as the fixed shift amount.

FIG. 55 is a diagram illustrating the weight matrix mWeight[i][j] of (M, m)=(1, 4) in a case where 96 is employed as the fixed offset coefficient and six is employed as the fixed shift amount.

FIG. 56 is a diagram illustrating the weight matrix mWeight[i][j] of (M, m)=(1, 5) in a case where 96 is employed as the fixed offset coefficient and six is employed as the fixed shift amount.

FIG. 57 is a diagram illustrating the weight matrix mWeight[i][j] of (M, m)=(1, 6) in a case where 96 is employed as the fixed offset coefficient and six is employed as the fixed shift amount.

FIG. 58 is a diagram illustrating the weight matrix mWeight[i][j] of (M, m)=(1, 7) in a case where 96 is employed as the fixed offset coefficient and six is employed as the fixed shift amount.

FIG. 59 is a diagram illustrating the weight matrix mWeight[i][j] of (M, m)=(2, 0) in a case where 96 is employed as the fixed offset coefficient and six is employed as the fixed shift amount.

FIG. 60 is a diagram illustrating the weight matrix mWeight[i][j] of (M, m)=(2, 1) in a case where 96 is employed as the fixed offset coefficient and six is employed as the fixed shift amount.

FIG. 61 is a diagram illustrating the weight matrix mWeight[i][j] of (M, m)=(2, 2) in a case where 96 is employed as the fixed offset coefficient and six is employed as the fixed shift amount.

FIG. 62 is a diagram illustrating the weight matrix mWeight[i][j] of (M, m)=(2, 3) in a case where 96 is employed as the fixed offset coefficient and six is employed as the fixed shift amount.

FIG. 63 is a diagram illustrating the weight matrix mWeight[i][j] of (M, m)=(2, 4) in a case where 96 is employed as the fixed offset coefficient and six is employed as the fixed shift amount.

FIG. 64 is a diagram illustrating the weight matrix mWeight[i][j] of (M, m)=(2, 5) in a case where 96 is employed as the fixed offset coefficient and six is employed as the fixed shift amount.

MODE FOR CARRYING OUT THE INVENTION

References

Figure 2:
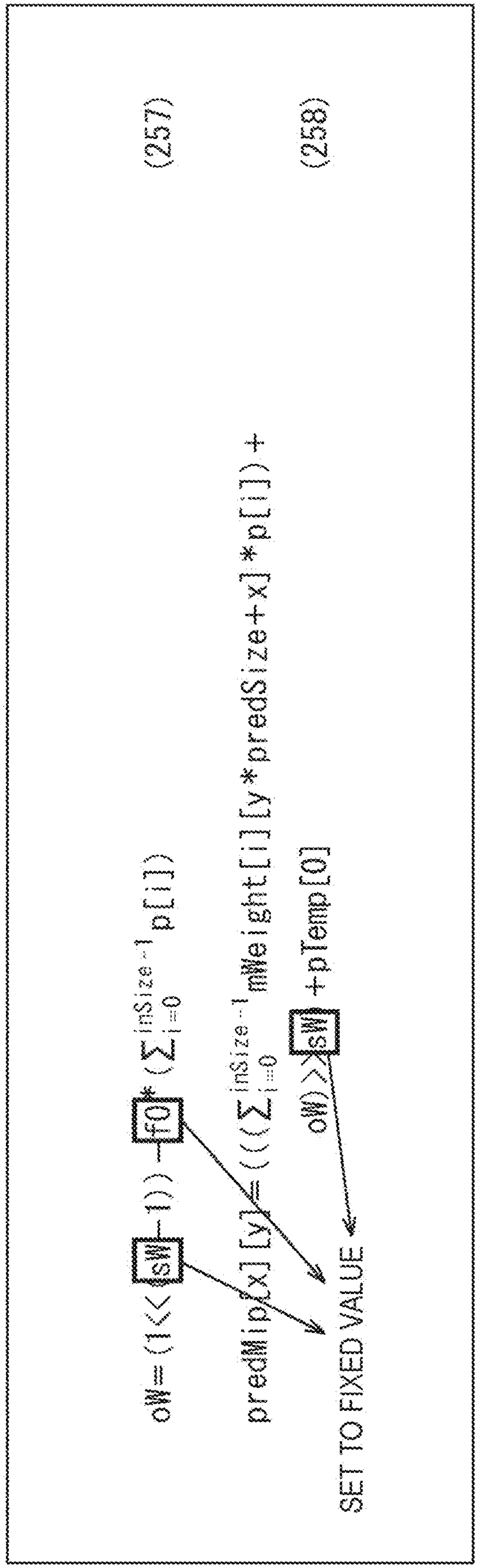
FIG. 2 is a diagram describing a second MIP method.

The scope disclosed in the present description is not limited to the contents of the embodiment, and the contents of the following References REF 1 to REF 11 known at the time of filing are also incorporated herein by reference. That is, the contents described in the following References REF 1 to REF 11 are also the basis for determining the support requirement. Moreover, the documents referred to in References REF 1 to REF 11 are also grounds for determining the support requirement.

For example, a quad-tree block structure, a quad tree plus binary tree (QTBT) block structure, and a multi-type tree (MTT) block structure are within the scope of the present disclosure and satisfy the support requirements of the claims even in a case where they are not directly defined in the detailed description of the invention. Furthermore, for example, technical terms such as parsing, syntax, and semantics are similarly within the scope of the present disclosure and satisfy the support requirements of the claims even in a case where not directly defined in the detailed description of the invention.

REF 1: Recommendation ITU-T H.264 (April 2017) “Advanced video coding for generic audiovisual services”, April 2017

REF 2: Recommendation ITU-T H.265 (February 2018) “High efficiency video coding”, February 2018

REF 3: Benjamin Bross, Jianle Chen, Shan Liu, Versatile Video Coding (Draft 7), JVET-P2001-v14 (version 14—date Nov. 14, 2019)

REF 4: Jianle Chen, Yan Ye, Seung Hwan Kim, Algorithm description for Versatile Video Coding and Test Model 7 (VTM 7), JVET-P2002-v1 (version 1—date 2019 Nov. 10)

REF 5: JVET-N0217-v3: CE3: Affine linear weighted intra prediction (CE3-4.1, CE3-4.2) (version 7—date 2019 Jan. 17)

REF 6: JVET-M0043-v2: CE3: Affine linear weighted intra prediction (test 1.2.1, test 1.2.2) (version 2—date 2019 Jan. 9)

REF 7: JVET-00408-v3: Non-CE3: On rounding shift of MIP (version 3 date 2019 Jul. 4)

REF 8: JVET-00925-v3: Non-CE3: Simplifications of MIP (version 3 date 2019 Jul. 4)

REF 9: Kenji Kondo, Masaru Ikeda, Teruhiko Suzuki, Junyan Huo, Yanzhuo Ma, Fuzheng Yan, Shuai Wan, Yuanfang Yu, CE3-2: On rounding shift of MIP, JVET-P0056-v3 (version 3—date 2019 Oct. 3)

REF 10: Junyan Huo, Haixin Wang, Yu Sun, Yanzhuo Ma, Shuai Wan, Fuzheng Yang. Yuanfang Yu, Yang Liu, Non-CE3: MIP simplification. JVET-P0136-v2 (version 3—date 2019 Oct. 4)

REF 11: Thibaud Biatek, Adarsh K. Ramasubramonian, Geert Van der Auwera, Marta Karczewicz, Non-CE3: simplified MIP with power-of-two offset. JVET-P0625-v2 (version 2—date 2019 Oct. 2)

Definitions

To be adjacent includes, for a pixel, not only a case where the pixel is adjacent to the current pixel of interest by one pixel (one line) but also a case where the pixel is adjacent to the current pixel of interest by a plurality of pixels (a plurality of lines). Therefore, an adjacent pixel includes a pixel at a position corresponding to a plurality of pixels continuously adjacent to the current pixel in addition to a pixel at a position corresponding to one pixel directly adjacent to the current pixel. Furthermore, an adjacent block includes a block in a range corresponding to a plurality of blocks continuously adjacent to the current block in addition to a block in a range corresponding to one block directly adjacent to the current block of interest. Moreover, the adjacent block can include a block located in the vicinity of the current block as necessary.

A prediction block means a block (prediction unit (PU)) serving as a processing unit when intra prediction or inter prediction is performed, and also includes a sub-block in the prediction block. In a case where the prediction block, an orthogonal transform block (transform unit (TU)), and an encoding block (coding unit (CU)) are unified into the same block, the prediction block, the orthogonal transform block, and the coding block mean the same block. The orthogonal transform block is a block serving as a processing unit when orthogonal transform is performed, and the encoding block is a block serving as a processing unit when encoding is performed.

The intra prediction mode collectively means variables (parameters) referring to when deriving the intra prediction mode, such as a mode number, a mode number index, a block size of the prediction block, and a size of a sub-block serving as a processing unit in the prediction block when intra prediction is performed.

The matrix-based intra prediction mode (MIP mode) means variables (parameters) referring to when deriving the matrix-based intra prediction mode, such as an MIP mode number, a mode number index, a type of a matrix used when the MIP operation is performed, and a type of a matrix size of a matrix used when the MIP operation is performed.

The parameter is a generic term for data required when encoding or decoding, and is typically a syntax of a bit stream, a parameter set, or the like. Moreover, the parameters include variables and the like used in a derivation process. For the MIP, various data used when the MIP operation is performed corresponds to the parameter. For example, the offset factor fO, a shift amount sW, and (the component of) the weight matrix mWeight[i][j], and the like described in REF 3 correspond to the parameters.

Changing means changing determined contents, for example, changing contents described in the publicly known document based on date before the present application date. Therefore, for example, being different from the content described in Reference REF 3 (values, arithmetic expressions, variables, and the like) corresponds to the change.

In the present technology, identification data for identifying a plurality of patterns can be set as syntax of a bit stream obtained by encoding an image. The bit stream can include identification data identifying various patterns.

In a case where the identification data is included in the bit stream, a decoder that decodes the bit stream can perform processing more efficiently by parsing and referring to the identification data.

<First MIP Method>

FIG. 1 is a diagram describing a first MIP method.

The first MIP method is a method of generating a predicted image of the MIP proposed in Reference REF 3 (JVET-P2001-v14).

In the first MIP method, (part of) pixels (pixel values of) predMip[x][y] of a predicted image of a current prediction block that is a prediction block to be encoded or decoded is generated according to the following expression described as Expression (258) in Reference REF 3.

$$predMip[x][y]=(((\Sigma mWeight[i][y*predSize+x]*p[i])+oW)>>sW)+pTemp[] \quad (258)$$

In Expression (258), a variable oW is calculated according to the following expression described as Expression (257) in Reference REF 3.

$$oW=(1<<(sW-1))-fO*(\Sigma p[i]) \quad (257)$$

A<<B and A>>B represent that A is shifted leftward and rightward by B bits, respectively.

Each of the variables in Expressions (258) and (257) is described in Reference REF 3, and thus the description thereof is appropriately omitted.

The predMip[x][y] represents (the pixel value of) a pixel whose horizontal position is x and whose vertical position is y in the predicted image. The pixel of the predicted image will be also referred to as a predicted pixel.

According to Expressions (258) and (257), in the first MIP method, MIP is performed using the weight matrix mWeight [i][j], the shift amount sW, and the offset factor fO set according to the MipSizeId and the modeId, and the pixel predMip[x][y] of the predicted image is generated.

Here, in Expressions (258) and (257), p[i] represents a change amount of (the pixel value of) the pixel pTemp[i] in the current prediction block. For example, p[i] is a change amount of the pixel pTemp[i] with reference to an upper left pixel pTemp[0] of the current prediction block, and is expressed by, for example, an expression p[i]=pTemp[i+1]−pTemp[0] or an expression p[i]=pTemp[i]−pTemp[0].

In Expression (257), the offset factor fO is a coefficient relating to the sum Σp[i] of the change amounts p[i] of pixel values.

The shift amount sW is set according to MipSizeId and modeId in accordance with Table 23 described in Reference REF 3. The offset factor fO is set according to MipSizeId and modeId in accordance with Table 24 described in Reference REF 3.

Note that although Reference REF 3 describes that "the variable sW is derived using mipSizeId and modeId as specified in Table 8-5)", the "Table 8-5" is a clerical error of "Table 23". Furthermore, although Reference REF 3 describes that "the variable fO is derived using mipSizeId and modeId as specified in Table 8-6", the "Table 8-6" is a clerical error of "Table 24".

Meanwhile, Reference REF 10 (JVET-P0136-v2) proposes deleting Table 24 of Reference REF 3, that is, not using the offset factor fO.

Furthermore, Reference REF 11 (JVET-P0625-v2) proposes to use a value represented by a power of two as the offset factor fO defined in Table 24 of Reference REF 3.

As proposed in Reference REF 10, by not using the offset factor fO, it is not necessary to set the offset factor fO according to the MipSizeId and the modeId, so that the MIP processing can be simplified.

However, in a case where the offset factor fO is not used, the range of the weight matrix mWeight[i][j] increases due to the influence of not using the offset factor fO. Consequently, the storage capacity for storing the weight matrix mWeight[i][j] increases.

As proposed in Reference REF 11, by using a value represented by a power of two as the offset factor fO defined in the Table 24, multiplication of the offset factor fO can be performed by shift operation, so that the MIP processing can be simplified.

However, even in a case where a value represented by a power of two is used as the offset factor fO defined in the Table 24, it is necessary to reset the offset factor fO according to the MipSizeId and the modeId similarly to a case where the current Table 24 is used, and the processing becomes complicated.

For example, in a case where the first MIP method is implemented by hardware, a selector for switching the offset factor fO is required, and the circuit scale increases. Furthermore, in a case where the first MIP method is implemented by software, it is necessary to prepare a table in which the offset factor fO represented by a power of two is defined and refer to the table, and the processing speed decreases.

Therefore, in the present technology, the MIP is performed using the offset factor fO set to a fixed value. That is, for example, operations of Expressions (258) and (257) are changed according to the offset factor fO set to the fixed value, and the predicted image of the MIP is generated according to the changed operation.

Hereinafter, the offset factor fO set to a fixed value as appropriate will be also referred to as a fixed offset coefficient. Since the fixed offset coefficient is the offset factor fO set to the fixed value, the fixed offset coefficient is a coefficient relating to the sum Σp[i] of the change amounts p[i] of the pixel value, similarly to the offset factor fO.

<Second MIP Method>

FIG. 2 is a diagram describing a second MIP method.

In the second MIP method, the offset factor fO of Expression (257) for generating the predicted image of the MIP proposed in Reference REF 3 is set to a fixed offset coefficient that is a fixed value.

By setting the offset factor fO to the fixed offset coefficient that is a fixed value, Table 24 of Reference REF 3 becomes unnecessary, and the MIP processing can be simplified.

As the fixed value used as the fixed offset coefficient, for example, a value that causes the range of the weight matrix mWeight[i][j] to be in a predetermined range can be employed.

That is, the weight matrix mWeight[i][j] changes from the value described in Reference REF 3 due to the influence of using the fixed offset coefficient. As the fixed offset coefficient, a value that causes the range of the weight matrix mWeight[i][j] after the change to fall within the predetermined range can be employed.

Moreover, as the fixed value used as the fixed offset coefficient, a value represented by a power of two or a value represented by a sum of powers of two can be employed.

In a case where the value represented by a power of two is employed as the fixed offset coefficient, multiplication of the sum Σp[i] of the change amounts p[i] of the pixel value at the time of calculating the variable oW in Expression (257) and the fixed offset coefficient can be performed only by shift operation. Therefore, the MIP processing can be simplified, that is, the calculation amount of the MIP processing can be reduced.

In a case where a value represented by the sum of powers of two is employed as the fixed offset coefficient, multiplication of the sum Σp[i] of the change amounts p[i] of the pixel value at the time of calculating the variable oW in Expression (257) and the fixed offset coefficient can be performed by shift operation and addition. Therefore, the MIP processing can be simplified, that is, the calculation amount of the MIP processing can be reduced.

Note that in a case where a value represented by a power of two is employed as the fixed offset coefficient, the degree of reduction in the calculation amount of the MIP processing is larger than that in a case where the value represented by the sum of powers of two is employed.

However, calculation accuracy can be enhanced, that is, a prediction error of the predicted image of the MIP can be reduced more in a case of employing the value represented by the sum of powers of two as the fixed offset coefficient than in a case of employing the value represented by a power of two.

As the value represented by a power of two, which is the fixed offset coefficient, for example, $32=2^5$ or the like can be employed. As the value represented by the sum of powers of two as the fixed offset coefficient, for example, $48=2^3+2^4$, $96=2^6+2^5$, or the like can be employed.

In the second MIP method, the shift amount sW of Expressions (258) and (257) for generating the predicted image of the MIP proposed in Reference REF 3 can be set to a fixed shift amount that is a fixed value.

By setting the shift amount sW to the fixed shift amount that is a fixed value, Table 23 of Reference REF 3 becomes unnecessary, and the MIP processing can be further simplified.

As the fixed shift amount, for example, one of 5, 6, and 7, which are three (types) shift amounts sW defined in Table 23 of Reference REF 3, can be employed.

In the second MIP method, the operation of Expression (258) is changed according to the fixed offset coefficient and the three shift amounts sW defined in Table 23 of Reference REF 3, or according to the fixed offset coefficient and the fixed shift amount, and the predicted image of the MIP is generated according to the changed operation.

That is, in the second MIP method, the weight matrix mWeight[i][j] is changed from the value described in Reference REF 3 according to the fixed offset coefficient and the three shift amounts sW defined in Table 23 of Reference REF 3, or according to the fixed offset coefficient and the fixed shift amount.

Hereinafter, in order to simplify the description, attention will be paid to a case where the fixed offset coefficient and the fixed shift amount are employed.

A predicted pixel predMip[x][y] obtained in a case where the offset factor fO and the shift amount sW are employed, that is, a predicted pixel predMip[x][y] (of the predicted image of the MIP) obtained according to Reference REF 3 will be also referred to as a standard predicted pixel predMip[x][y].

In the second MIP method, for example, the weight matrix mWeight[i][j] described in Reference REF 3 is changed according to the fixed offset coefficient and the fixed shift amount so that a predicted pixel (hereinafter also referred to as a fixed predicted pixel) obtained in a case where the fixed offset coefficient and the fixed shift amount are employed, that is, the predicted pixel predMip[x][y] obtained according to an expression obtained by replacing the offset factor fO and the shift amount sW in Expressions (258) and (257) with the fixed offset coefficient and the fixed shift amount, respectively, has a value approximate to the standard predicted pixel predMip[x][y]. Alternatively, the weight matrix mWeight[i][j] described in Reference REF 3 is changed according to the fixed offset coefficient and the fixed shift amount so that a prediction error of the fixed predicted pixel predMip[x][y] becomes close to a prediction error of the standard predicted pixel predMip[x][y].

For example, 32 which is a value represented by a power of two can be employed as the fixed offset coefficient, and six can be employed as the fixed shift amount. In this case, the changed weight matrix mWeight[i][j] can fall within a range that can be represented by seven bits from zero to 127.

In the second MIP method, a predicted image of MIP is generated according to the calculation including the weight matrix mWeight[i][j] after the change.

Therefore, in the second MIP method, the offset factor fO of Expressions (258) and (257) and further the shift amount sW are fixed regardless of the combination of MipSizeId and modeId, and thus the MIP processing can be simplified. Consequently, it is not necessary to define Table 24 and further Table 23 of Reference REF 3 by the standard, and the standard can be simplified.

Furthermore, for example, in a case where the second MIP method is implemented by hardware, a selector for switching the offset factor fO and the shift amount sW becomes unnecessary, and increase in the circuit scale can be suppressed. Moreover, in a case where the second MIP method is implemented by software, it is not necessary to refer to Table 24 or Table 23, and decrease in processing speed can be suppressed as compared with a case where Table 24 or Table 23 is referred to.

Note that, as the fixed offset coefficient, a value represented by a power of two other than 32 or a value represented by the sum of powers of two other than 48 and 96 can be employed. Furthermore, as the fixed shift amount, a value other than five, six, and seven can be employed.

<MIP in Case where 48 is Employed as Fixed Offset Coefficient and Five is Employed as Fixed Shift Amount>

FIG. 3 is a diagram describing the MIP in a case where 48 is employed as the fixed offset coefficient and five is employed as the fixed shift amount.

In this case, in the MIP, as illustrated in FIG. 3, an operation is performed in which the offset factor fO and the shift amount sW in Expressions (258) and (257) are replaced with 48 that is the fixed offset coefficient and five that is the fixed shift amount, respectively.

A of FIG. 3 illustrates an operation performed by the MIP in a case where multiplication $48*(\Sigma p[i])$ of the sum $\Sigma p[i]$ of the change amounts p[i] of the pixel values and 48 that is the fixed offset coefficient is performed as it is as the multiplication in the operation in which the offset factor fO and the shift amount sW in Expression (257) are replaced with 48 that is the fixed offset coefficient and five that is the fixed shift amount, respectively.

B of FIG. 3 illustrates an operation performed by the MIP in a case where the multiplication $48*(\Sigma p[i])$ of the sum $\Sigma p[i]$ of the change amounts p[i] of the pixel values and 48 that is the fixed offset coefficient is performed by the shift operation and the addition in the operation in which the offset factor fO and the shift amount sW in Expression (257) are replaced with 48 that is the fixed offset coefficient and five that is the fixed shift amount, respectively.

In the case where the multiplication $48*(\Sigma p[i])$ of the sum $\Sigma p[i]$ of the change amounts p[i] of the pixel values and 48 that is the fixed offset coefficient is performed as it is as the multiplication in the operation in which the offset factor fO and the shift amount sW in Expression (257) are replaced with 48 that is the fixed offset coefficient and five that is the fixed shift amount, respectively, the operation illustrated in A of FIG. 3 is performed.

That is, an operation of an expression in which the offset factor fO and the shift amount sW in Expressions (258) and (257) are replaced with 48 that is the fixed offset coefficient and five that is the fixed shift amount, respectively, is performed.

In the case where the multiplication $48*(\Sigma p[i])$ of the sum $\Sigma p[i]$ of the change amounts p[i] of the pixel values and 48 that is the fixed offset coefficient is performed by the shift operation and the addition in the operation in which the offset factor fO and the shift amount sW in Expression (257) are replaced with 48 that is the fixed offset coefficient and five that is the fixed shift amount, respectively, the operation illustrated in B of FIG. 3 is performed.

That is, the sum=$\Sigma p[i]$ of the change amounts p[i] of the pixel values is calculated. Then, the multiplication $48*(\Sigma p[i])$ of the sum $\Sigma p[i]$ of the change amounts p[i] of the pixel values and 48 that is the fixed offset coefficient is performed by the shift operation (sum<<5) and (sum<<4) of the sum and addition of results of the shift operation (sum<<5) and (sum<<4). Thus, the variable oW of Expression (257) is calculated.

Thereafter, in both cases of A and B of FIG. 3, the operation of the expression in which the shift amount sW in Expression (258) is replaced with five that is the fixed shift amount is performed using the variable oW.

Here, a combination of the MipSizeId and the modeId is represented as (M, m). M represents the MipSizeId, and m represents the modeId. Furthermore, the weight matrix mWeight[i][j] in a case where the fixed offset coefficient and the fixed shift amount are employed will be also referred to as a fixed weight matrix mWeight[i][j].

FIG. 4 is a diagram illustrating an example of the weight matrix mWeight[i][j] of (M, m)=(0, 0) in the case where 48 is employed as the fixed offset coefficient and five is employed as the fixed shift amount.

In FIG. 4, the (i+1)th value from the left and the (j+1)th value from the top represent the fixed weight matrix mWeight[i][j]. This similarly applies to the following drawings.

Note that the fixed weight matrix mWeight[i][j] of (M, m)=(0, 0) in the case where 48 is employed as the fixed offset coefficient and five is employed as the fixed shift amount is not limited to the values illustrated in FIG. 4.

The fixed weight matrix mWeight[i][j] of (M, m)=(0, 0) can be appropriately changed as long as within a range in which the operation is performed using the fixed offset coefficient and the fixed shift amount and technical effects are exhibited correspondingly. Furthermore, since the range in which the technical effects are exhibited varies depending on the approximation level to be set, the fixed weight matrix mWeight[i][j] of (M, m)=(0, 0) can be changed as appropriate within the range. For example, the change can be made within the range of ±1, and the change can be made within the range of ±3. Moreover, not only all the values can be changed uniformly, but also only some of the values can be changed. Furthermore, it is also possible to individually set a range of values to be changed with respect to existing values.

That is, for example, the fixed weight matrix mWeight[i][j] of (M, m)=(0, 0) can be appropriately changed within a range in which a technical effect such as ensuring predetermined prediction accuracy or more for the predicted image is appropriately exhibited when the operations of Expressions (258) and (257) are performed using the fixed offset coefficient and the fixed shift amount.

Furthermore, the range (degree) in which the technical effect is exhibited changes depending on how much the approximation level is set.

The approximation level means the degree to which the fixed predicted pixel predMip[x][y] is approximated to the true value of the fixed predicted pixel predMip[x][y] or the standard predicted pixel predMip[x][y]. The fixed predicted pixel predMip[x][y] means (a pixel value of) a predicted pixel obtained by MIP using the fixed offset coefficient and the fixed shift amount. The standard predicted pixel predMip[x][y] means a predicted pixel obtained by MIP using the offset factor fO and the shift amount sW described in Reference REF 3.

The fixed weight matrix mWeight[i][j] of (M, m)=(0, 0) can be appropriately changed within a range in which the set approximation level can be maintained.

For example, the fixed weight matrix mWeight[i][j] of (M, m)=(0, 0) can be changed within a range of ±1 or within a range of ±3 with reference to the value illustrated in FIG. 4.

The change of the fixed weight matrix mWeight[i][j] of (M, m)=(0, 0) can be performed for all of the fixed weight matrices mWeight[i][j] of (M, m)=(0, 0), and can be performed for only a part of the fixed weight matrix mWeight[i][j] of (M, m)=(0, 0).

Moreover, as the range of values for changing the fixed weight matrix mWeight[i][j] of (M, m)=(0, 0), a uniform range can be employed for all of the fixed weight matrices mWeight[i][j] of (M, m)=(0, 0), or an individual range can be employed for each fixed weight matrix mWeight[i][j] of (M, m)=(0, 0).

For example, the range of values for changing the fixed weight matrix mWeight[i][j] of (M, m)=(0, 0) can be individually set for each value of the corresponding weight matrix mWeight[i][j].

The above point similarly applies to the fixed weight matrix mWeight[i][j] other than (M, m)=(0, 0).

FIG. 5 is a diagram illustrating an example of the weight matrix mWeight[i][j] of (M, m)=(0, 1) in the case where 48 is employed as the fixed offset coefficient and five is employed as the fixed shift amount.

FIG. 6 is a diagram illustrating the weight matrix mWeight[i][j] of (M, m)=(0, 2) in the case where 48 is employed as the fixed offset coefficient and five is employed as the fixed shift amount.

FIG. 7 is a diagram illustrating the weight matrix mWeight[i][j] of (M, m)=(0, 3) in the case where 48 is employed as the fixed offset coefficient and five is employed as the fixed shift amount.

FIG. 8 is a diagram illustrating the weight matrix mWeight[i][j] of (M, m)=(0, 4) in the case where 48 is employed as the fixed offset coefficient and five is employed as the fixed shift amount.

FIG. 9 is a diagram illustrating the weight matrix mWeight[i][j] of (M, m)=(0, 5) in the case where 48 is employed as the fixed offset coefficient and five is employed as the fixed shift amount.

FIG. 10 is a diagram illustrating the weight matrix mWeight[i][j] of (M, m)=(0, 6) in the case where 48 is employed as the fixed offset coefficient and five is employed as the fixed shift amount.

FIG. 11 is a diagram illustrating the weight matrix mWeight[i][j] of (M, m)=(0, 7) in the case where 48 is employed as the fixed offset coefficient and five is employed as the fixed shift amount.

FIG. 12 is a diagram illustrating the weight matrix mWeight[i][j] of (M, m)=(0, 8) in the case where 48 is employed as the fixed offset coefficient and five is employed as the fixed shift amount.

FIG. 13 is a diagram illustrating the weight matrix mWeight[i][j] of (M, m)=(0, 9) in the case where 48 is employed as the fixed offset coefficient and five is employed as the fixed shift amount.

FIG. 14 is a diagram illustrating the weight matrix mWeight[i][j] of (M, m)=(0, 10) in the case where 48 is employed as the fixed offset coefficient and five is employed as the fixed shift amount.

FIG. 15 is a diagram illustrating the weight matrix mWeight[i][j] of (M, m)=(0, 11) in the case where 48 is employed as the fixed offset coefficient and five is employed as the fixed shift amount.

FIG. 16 is a diagram illustrating the weight matrix mWeight[i][j] of (M, m)=(0, 12) in the case where 48 is employed as the fixed offset coefficient and five is employed as the fixed shift amount.

FIG. 17 is a diagram illustrating the weight matrix mWeight[i][j] of (M, m)=(0, 13) in the case where 48 is employed as the fixed offset coefficient and five is employed as the fixed shift amount.

FIG. 18 is a diagram illustrating the weight matrix mWeight[i][j] of (M, m)=(0, 14) in the case where 48 is employed as the fixed offset coefficient and five is employed as the fixed shift amount.

FIG. 19 is a diagram illustrating the weight matrix mWeight[i][j] of (M, m)=(0, 15) in the case where 48 is employed as the fixed offset coefficient and five is employed as the fixed shift amount.

FIG. 20 is a diagram illustrating the weight matrix mWeight[i][j] of (M, m)=(1, 0) in the case where 48 is employed as the fixed offset coefficient and five is employed as the fixed shift amount.

FIG. 21 is a diagram illustrating the weight matrix mWeight[i][j] of (M, m)=(1, 1) in the case where 48 is employed as the fixed offset coefficient and five is employed as the fixed shift amount.

FIG. 22 is a diagram illustrating the weight matrix mWeight[i][j] of (M, m)=(1, 2) in the case where 48 is employed as the fixed offset coefficient and five is employed as the fixed shift amount.

FIG. 23 is a diagram illustrating the weight matrix mWeight[i][j] of (M, m)=(1, 3) in the case where 48 is employed as the fixed offset coefficient and five is employed as the fixed shift amount.

FIG. 24 is a diagram illustrating the weight matrix mWeight[i][j] of (M, m)=(1, 4) in the case where 48 is employed as the fixed offset coefficient and five is employed as the fixed shift amount.

FIG. 25 is a diagram illustrating the weight matrix mWeight[i][j] of (M, m)=(1, 5) in the case where 48 is employed as the fixed offset coefficient and five is employed as the fixed shift amount.

FIG. 26 is a diagram illustrating the weight matrix mWeight[i][j] of (M, m)=(1, 6) in the case where 48 is employed as the fixed offset coefficient and five is employed as the fixed shift amount.

FIG. 27 is a diagram illustrating the weight matrix mWeight[i][j] of (M, m)=(1, 7) in the case where 48 is employed as the fixed offset coefficient and five is employed as the fixed shift amount.

FIG. 28 is a diagram illustrating the weight matrix mWeight[i][j] of (M, m)=(2, 0) in the case where 48 is employed as the fixed offset coefficient and five is employed as the fixed shift amount.

FIG. 29 is a diagram illustrating the weight matrix mWeight[i][j] of (M, m)=(2, 1) in the case where 48 is employed as the fixed offset coefficient and five is employed as the fixed shift amount.

FIG. 30 is a diagram illustrating the weight matrix mWeight[i][j] of (M, m)=(2, 2) in the case where 48 is employed as the fixed offset coefficient and five is employed as the fixed shift amount.

FIG. 31 is a diagram illustrating the weight matrix mWeight[i][j] of (M, m)=(2, 3) in the case where 48 is employed as the fixed offset coefficient and five is employed as the fixed shift amount.

FIG. 32 is a diagram illustrating the weight matrix mWeight[i][j] of (M, m)=(2, 4) in the case where 48 is employed as the fixed offset coefficient and five is employed as the fixed shift amount.

FIG. 33 is a diagram illustrating the weight matrix mWeight[i][j] of (M, m)=(2, 5) in the case where 48 is employed as the fixed offset coefficient and five is employed as the fixed shift amount.

<MIP in Case Where 96 is Employed as Fixed Offset Coefficient and Six is Employed as Fixed Shift Amount>

FIG. 34 is a diagram describing the MIP in a case where 96 is employed as the fixed offset coefficient and six is employed as the fixed shift amount.

In this case, in the MIP, as illustrated in FIG. 34, an operation is performed in which the offset factor fO and the shift amount sW in Expressions (258) and (257) are replaced with 96 as the fixed offset coefficient and six as the fixed shift amount, respectively.

A of FIG. 34 illustrates an operation performed by the MIP in a case where multiplication 96*(Σp[i]) of the sum Σp[i] of the change amounts p[i] of the pixel values and 96 that is the fixed offset coefficient is performed as it is as the multiplication in the operation in which the offset factor fO and the shift amount sW in Expression (257) are replaced with 96 that is the fixed offset coefficient and six that is the fixed shift amount, respectively.

B of FIG. 34 illustrates an operation performed by the MIP in a case where the multiplication 96*(Σp[i]) of the sum Σp[i] of the change amounts p[i] of the pixel values and 96 that is the fixed offset coefficient is performed by the shift operation and the addition in the operation in which the offset factor fO and the shift amount sW in Expression (257) are replaced with 96 that is the fixed offset coefficient and six that is the fixed shift amount, respectively.

In a case where the multiplication 96*(Σp[i]) of the sum Σp[i] of the change amounts p[i] of the pixel values and 96 that is the fixed offset coefficient is performed as it is as the multiplication in the operation in which the offset factor fO and the shift amount sW in Expression (257) are replaced with 96 that is the fixed offset coefficient and six that is the fixed shift amount, respectively, the operation illustrated in A of FIG. 34 is performed.

That is, the calculation of the expressions in which the offset factor fO and the shift amount sW in Expressions (258) and (257) are replaced with 96 that is the fixed offset coefficient and six that is the fixed shift amount, respectively, is performed.

In a case where the multiplication 96*(Σp[i]) of the sum Σp[i] of the change amounts p[i] of the pixel values and 96 that is the fixed offset coefficient is performed by the shift operation and the addition in the operation in which the offset factor fO and the shift amount sW in Expression (257) are replaced with 96 that is the fixed offset coefficient and six that is the fixed shift amount, respectively, the operation illustrated in B of FIG. 34 is performed.

That is, the sum=Σp[i] of the change amounts p[i] of the pixel values is calculated. Then, the multiplication 96*(Σp[i]) of the sum Σp[i] of the change amounts p[i] of the pixel values and 96 that is the fixed offset coefficient is performed by shift operation (sum<<6) and (sum<<5) of the sum and addition of results of the shift operation (sum<<6) and (sum<<5). Thus, the variable oW of Expression (257) is calculated.

Thereafter, in both cases of A and B of FIG. 34, the operation of the expression in which the shift amount sW in Expression (258) is replaced with six that is the fixed shift amount is performed using the variable oW.

FIG. 35 is a diagram illustrating an example of the weight matrix mWeight[i][j] of (M, m)=(0, 0) in a case where 96 is employed as the fixed offset coefficient and six is employed as the fixed shift amount.

FIG. 36 is a diagram illustrating an example of the weight matrix mWeight[i][j] of (M, m)=(0, 1) in a case where 96 is employed as the fixed offset coefficient and six is employed as the fixed shift amount.

FIG. 37 is a diagram illustrating the weight matrix mWeight[i][j] of (M, m)=(0, 2) in a case where 96 is employed as the fixed offset coefficient and six is employed as the fixed shift amount.

FIG. 38 is a diagram illustrating the weight matrix mWeight[i][j] of (M, m)=(0, 3) in a case where 96 is employed as the fixed offset coefficient and six is employed as the fixed shift amount.

FIG. 39 is a diagram illustrating the weight matrix mWeight[i][j] of (M, m)=(0, 4) in a case where 96 is employed as the fixed offset coefficient and six is employed as the fixed shift amount.

FIG. 40 is a diagram illustrating the weight matrix mWeight[i][j] of (M, m)=(0, 5) in a case where 96 is employed as the fixed offset coefficient and six is employed as the fixed shift amount.

FIG. 41 is a diagram illustrating the weight matrix mWeight[i][j] of (M, m)=(0, 6) in a case where 96 is employed as the fixed offset coefficient and six is employed as the fixed shift amount.

FIG. 42 is a diagram illustrating the weight matrix mWeight[i][j] of (M, m)=(0, 7) in a case where 96 is employed as the fixed offset coefficient and six is employed as the fixed shift amount.

FIG. 43 is a diagram illustrating the weight matrix mWeight[i][j] of (M, m)=(0, 8) in a case where 96 is employed as the fixed offset coefficient and six is employed as the fixed shift amount.

FIG. 44 is a diagram illustrating the weight matrix mWeight[i][j] of (M, m)=(0, 9) in a case where 96 is employed as the fixed offset coefficient and six is employed as the fixed shift amount.

FIG. 45 is a diagram illustrating the weight matrix mWeight[i][j] of (M, m)=(0, 10) in a case where 96 is employed as the fixed offset coefficient and six is employed as the fixed shift amount.

FIG. 46 is a diagram illustrating the weight matrix mWeight[i][j] of (M, m)=(0, 11) in a case where 96 is employed as the fixed offset coefficient and six is employed as the fixed shift amount.

FIG. 47 is a diagram illustrating the weight matrix mWeight[i][j] of (M, m)=(0, 12) in a case where 96 is employed as the fixed offset coefficient and six is employed as the fixed shift amount.

FIG. 48 is a diagram illustrating the weight matrix mWeight[i][j] of (M, m)=(0, 13) in a case where 96 is employed as the fixed offset coefficient and six is employed as the fixed shift amount.

FIG. 49 is a diagram illustrating the weight matrix mWeight[i][j] of (M, m)=(0, 14) in a case where 96 is employed as the fixed offset coefficient and six is employed as the fixed shift amount.

FIG. 50 is a diagram illustrating the weight matrix mWeight[i][j] of (M, m)=(0, 15) in a case where 96 is employed as the fixed offset coefficient and six is employed as the fixed shift amount.

FIG. 51 is a diagram illustrating the weight matrix mWeight[i][j] of (M, m)=(1, 0) in a case where 96 is employed as the fixed offset coefficient and six is employed as the fixed shift amount.

FIG. 52 is a diagram illustrating the weight matrix mWeight[i][j] of (M, m)=(1, 1) in a case where 96 is employed as the fixed offset coefficient and six is employed as the fixed shift amount.

FIG. 53 is a diagram illustrating the weight matrix mWeight[i][j] of (M, m)=(1, 2) in a case where 96 is employed as the fixed offset coefficient and six is employed as the fixed shift amount.

FIG. 54 is a diagram illustrating the weight matrix mWeight[i][j] of (M, m)=(1, 3) in a case where 96 is employed as the fixed offset coefficient and six is employed as the fixed shift amount.

FIG. 55 is a diagram illustrating the weight matrix mWeight[i][j] of (M, m)=(1, 4) in a case where 96 is employed as the fixed offset coefficient and six is employed as the fixed shift amount.

FIG. 56 is a diagram illustrating the weight matrix mWeight[i][j] of (M, m)=(1, 5) in a case where 96 is employed as the fixed offset coefficient and six is employed as the fixed shift amount.

FIG. 57 is a diagram illustrating the weight matrix mWeight[i][j] of (M, m)=(1, 6) in a case where 96 is employed as the fixed offset coefficient and six is employed as the fixed shift amount.

FIG. 58 is a diagram illustrating the weight matrix mWeight[i][j] of (M, m)=(1, 7) in a case where 96 is employed as the fixed offset coefficient and six is employed as the fixed shift amount.

FIG. 59 is a diagram illustrating the weight matrix mWeight[i][j] of (M, m)=(2, 0) in a case where 96 is employed as the fixed offset coefficient and six is employed as the fixed shift amount.

FIG. 60 is a diagram illustrating the weight matrix mWeight[i][j] of (M, m)=(2, 1) in a case where 96 is employed as the fixed offset coefficient and six is employed as the fixed shift amount.

FIG. 61 is a diagram illustrating the weight matrix mWeight[i][j] of (M, m)=(2, 2) in a case where 96 is employed as the fixed offset coefficient and six is employed as the fixed shift amount.

FIG. 62 is a diagram illustrating the weight matrix mWeight[i][j] of (M, m)=(2, 3) in a case where 96 is employed as the fixed offset coefficient and six is employed as the fixed shift amount.

FIG. 63 is a diagram illustrating the weight matrix mWeight[i][j] of (M, m)=(2, 4) in a case where 96 is employed as the fixed offset coefficient and six is employed as the fixed shift amount.

FIG. 64 is a diagram illustrating the weight matrix mWeight[i][j] of (M, m)=(2, 5) in a case where 96 is employed as the fixed offset coefficient and six is employed as the fixed shift amount.

<Image Processing System to which Present Technology is Applied>

Figure 65:
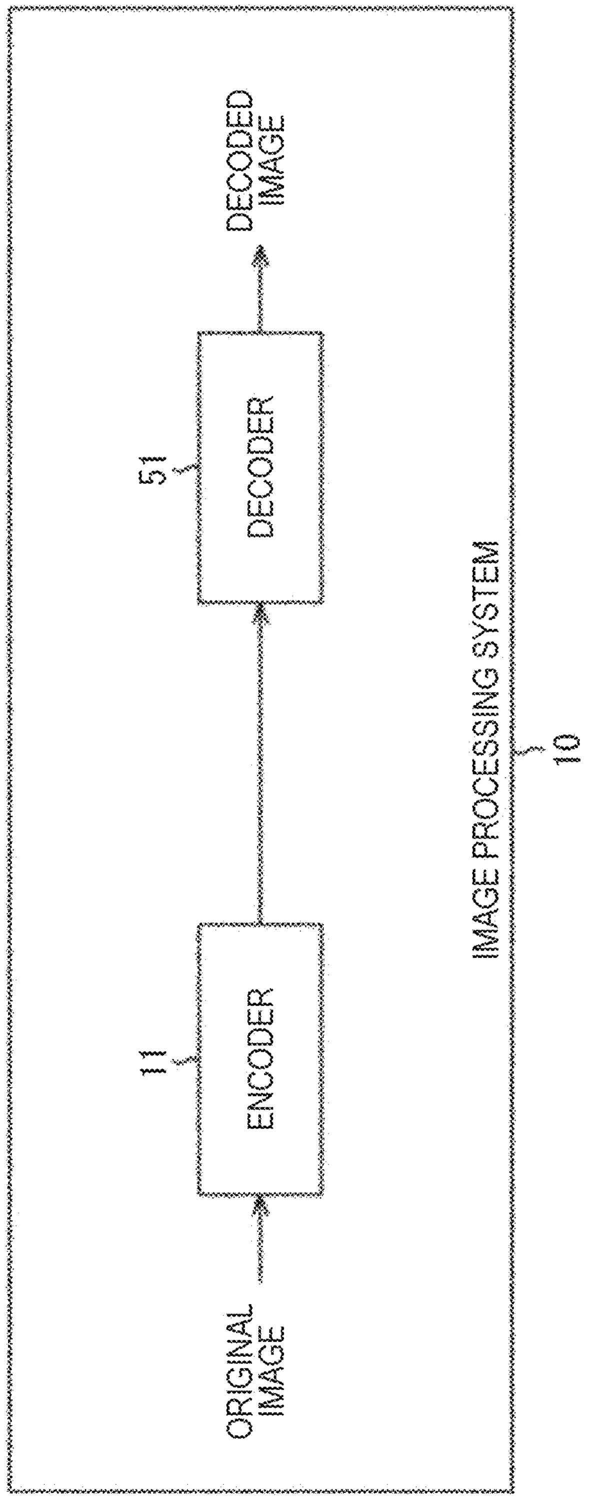
FIG. 65 is a block diagram illustrating a configuration example of an embodiment of an image processing system to which the present technology is applied.

FIG. 65 is a block diagram illustrating a configuration example of an embodiment of an image processing system to which the present technology is applied.

The image processing system 10 includes an image processing device as an encoder 11 and an image processing device as a decoder 51.

The encoder 11 encodes an original image that is an encoding target supplied thereto, and outputs a coded bit stream obtained by the encoding. The coded bit stream is supplied to the decoder 51 via a recording medium or a transmission medium that is not illustrated.

The decoder 51 decodes the coded bit stream supplied thereto, and outputs a decoded image obtained by the decoding.

<Configuration Example of Encoder 11>

Figure 66:
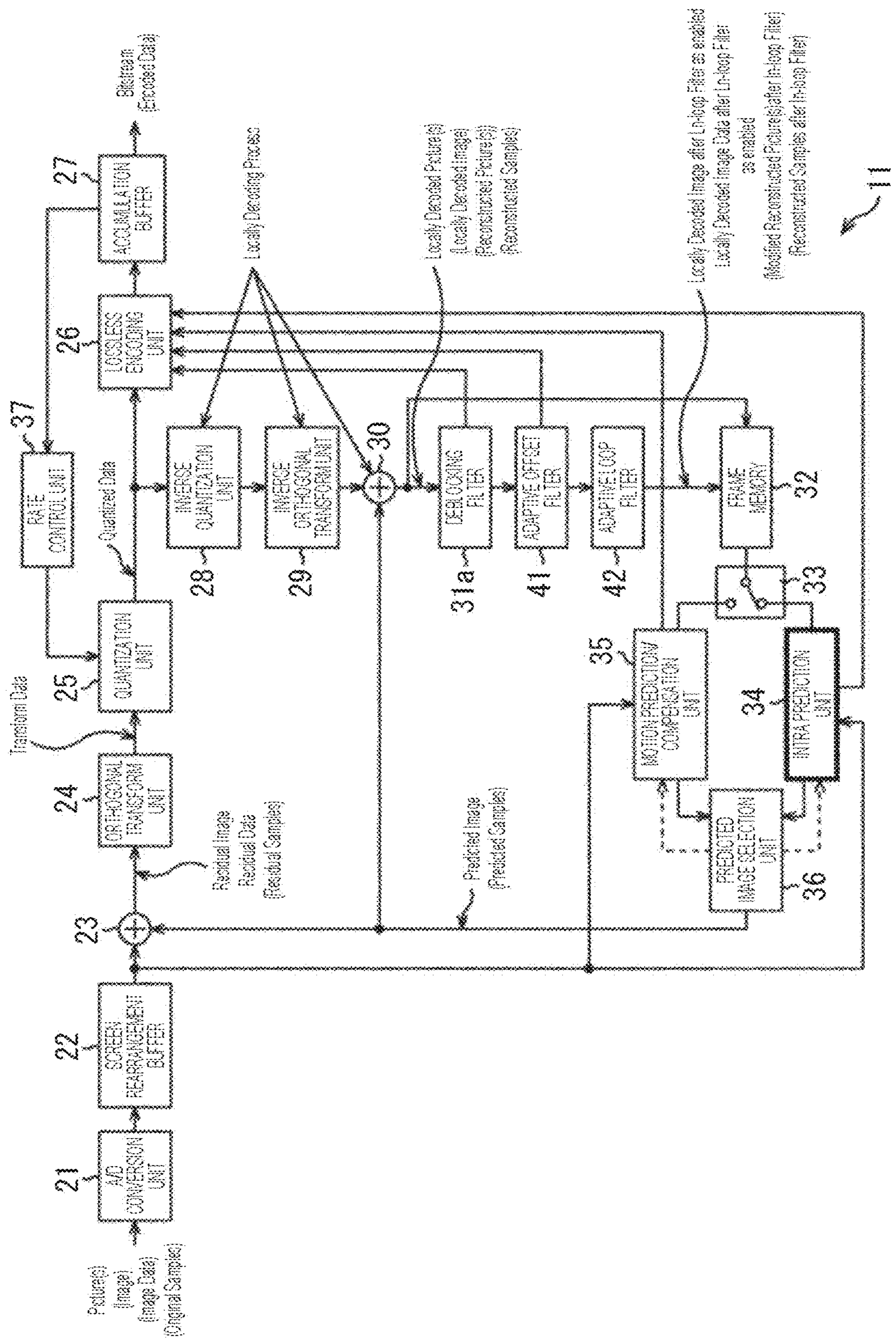
FIG. 66 is a block diagram illustrating a configuration example of an encoder 11.

FIG. 66 is a block diagram illustrating a configuration example of the encoder 11 in FIG. 65.

Note that in the block diagram described below, a description of a line that supplies information (data) required for processing of each block is omitted as appropriate in order to avoid complication of the diagram.

In FIG. 66, the encoder 11 includes an A/D conversion unit 21, a rearrangement buffer 22, an operation unit 23, an orthogonal transform unit 24, a quantization unit 25, a reversible encoding unit 26, and an accumulation buffer 27. Moreover, the encoder 11 includes an inverse quantization unit 28, an inverse orthogonal transform unit 29, an operation unit 30, a frame memory 32, a selection unit 33, an intra prediction unit 34, a motion prediction compensation unit 35, a predicted image selection unit 36, and a rate control unit 37. Furthermore, the encoder 11 includes a deblocking filter 31*a*, an adaptive offset filter 41, and an adaptive loop filter (ALF) 42.

The A/D conversion unit 21 A/D-converts an original image (encoding target) of an analog signal into an original image of a digital signal, and supplies the original image to the rearrangement buffer 22 for storage. Note that in a case where the original image of the digital signal is supplied to the encoder 11, the encoder 11 can be configured without the A/D conversion unit 21.

The rearrangement buffer 22 rearranges the frames of the original image from a display order to an encoding (decoding) order according to a group of picture (GOP), and supplies the original image to the operation unit 23, the intra prediction unit 34, and the motion prediction compensation unit 35.

The operation unit 23 subtracts the predicted image supplied from the intra prediction unit 34 or the motion prediction compensation unit 35 via the predicted image selection unit 36 from the original image from the rearrangement buffer 22, and supplies a residual (prediction residual) obtained by the subtraction to the orthogonal transform unit 24.

The orthogonal transform unit 24 performs orthogonal transform such as discrete cosine transform or Karhunen-Loeve transform on the residual supplied from the operation unit 23, and supplies an orthogonal transform coefficient obtained by the orthogonal transform to the quantization unit 25.

The quantization unit 25 quantizes the orthogonal transform coefficient supplied from the orthogonal transform unit 24. The quantization unit 25 sets a quantization parameter on the basis of the target value (code amount target value) of the code amount supplied from the rate control unit 37 and quantizes the orthogonal transform coefficient. The quantization unit 25 supplies the coded data, which is the quantized orthogonal transform coefficient, to the reversible encoding unit 26.

The reversible encoding unit 26 encodes the quantized orthogonal transform coefficient as the coded data from the quantization unit 25 by a predetermined reversible encoding method.

Furthermore, the reversible encoding unit 26 acquires, from each block, encoding information necessary for decoding by the decoding device 170 out of the encoding information related to predictive encoding by the encoder 11.

Here, examples of the encoding information include prediction modes of intra prediction and inter prediction, motion information such as a motion vector, a code amount target value, a quantization parameter, a picture type (I, P, B), filter parameters of the deblocking filter 31*a* and the adaptive offset filter 41, and the like.

The prediction mode can be acquired from the intra prediction unit 34 or the motion prediction compensation unit 35. The motion information can be acquired from the motion prediction compensation unit 35. The filter parameters of the deblocking filter 31*a* and the adaptive offset filter 41 can be acquired from the deblocking filter 31*a* and the adaptive offset filter 41, respectively.

The reversible encoding unit 26 encodes the encoding information by, for example, variable-length encoding or arithmetic encoding such as context-adaptive variable length coding (CAVLC) or context-adaptive binary arithmetic coding (CABAC), or any other reversible encoding method, generates a coded bit stream (multiplexed) including the encoding information after encoding and the coded data from the quantization unit 25, and supplies the coded bit stream to the accumulation buffer 27.

Here, the operation unit 23 to the reversible encoding unit 26 described above constitute an encoding unit that encodes an image, and processing (step) performed by the encoding unit is an encoding step.

The accumulation buffer 27 temporarily accumulates the coded bit stream supplied from the reversible encoding unit 26. The coded bit stream accumulated in the accumulation buffer 27 is read and transmitted at a predetermined timing.

The coded data that is the orthogonal transform coefficient quantized in the quantization unit 25 is supplied to the reversible encoding unit 26 and also supplied to the inverse quantization unit 28. The inverse quantization unit 28 inversely quantizes the quantized orthogonal transform coefficient by a method corresponding to the quantization by the quantization unit 25, and supplies the orthogonal transform coefficient obtained by the inverse quantization to the inverse orthogonal transform unit 29.

The inverse orthogonal transform unit 29 inversely orthogonally transforms the orthogonal transform coefficient supplied from the inverse quantization unit 28 by a method corresponding to orthogonal transform processing by the orthogonal transform unit 24, and supplies the residual obtained as a result of the inverse orthogonal transform to the operation unit 30.

The operation unit 30 adds the predicted image supplied from the intra prediction unit 34 or the motion prediction compensation unit 35 via the predicted image selection unit 36 to the residual supplied from the inverse orthogonal transform unit 29, thereby obtaining and outputting (a part of) the decoded image obtained by decoding the original image.

The decoded image output from the operation unit 30 is supplied to the deblocking filter 31*a* or the frame memory 32.

The frame memory 32 temporarily stores the decoded image supplied from the operation unit 30 and the decoded image (filtered image), to which the deblocking filter 31*a*, the adaptive offset filter 41, and the ALF 42 are applied, that is supplied from the ALF 42. The decoded image stored in the frame memory 32 is supplied to the selection unit 33 as a reference image to be used for generating a predicted image at a necessary timing.

The selection unit 33 selects a supply destination of the reference image supplied from the frame memory 32. In a case where intra prediction is performed in the intra prediction unit 34, the selection unit 33 supplies the reference image supplied from the frame memory 32 to the intra prediction unit 34. In a case where inter prediction is performed in the motion prediction compensation unit 35, the selection unit 33 supplies the reference image supplied from the frame memory 32 to the motion prediction compensation unit 35.

The intra prediction unit 34 performs intra prediction (intra screen prediction) using the original image supplied from the rearrangement buffer 22 and the reference image supplied from the frame memory 32 via the selection unit 33. The intra prediction unit 34 selects an optimum prediction mode of intra prediction on the basis of a predetermined cost function, and supplies a predicted image generated from the reference image in the optimum prediction mode of intra prediction to the predicted image selection unit 36. Furthermore, the intra prediction unit 34 appropriately supplies the prediction mode of intra prediction selected on the basis of the cost function to the reversible encoding unit 26 and the like.

The motion prediction compensation unit 35 performs motion prediction using the original image supplied from the rearrangement buffer 22 and the reference image supplied from the frame memory 32 via the selection unit 33. Moreover, the motion prediction compensation unit 35 performs motion compensation according to a motion vector detected by motion prediction, and generates a predicted image. The motion prediction compensation unit 35 performs inter prediction in a plurality of prediction modes of inter prediction prepared in advance, and generates a predicted image from the reference image.

The motion prediction compensation unit 35 selects an optimum prediction mode of inter prediction from among a plurality of prediction modes of inter prediction on the basis of a predetermined cost function. Moreover, the motion prediction compensation unit 35 supplies the predicted image generated in the optimum prediction mode of inter prediction to the predicted image selection unit 36.

Furthermore, the motion prediction compensation unit 35 supplies the optimum prediction mode of inter prediction selected on the basis of the cost function, the motion information such as the motion vector necessary for decoding the coded data that is coded in the prediction mode of inter prediction, and the like to the reversible encoding unit 26.

The predicted image selection unit 36 selects a supply source of the predicted image to be supplied to the operation unit 23 and the operation unit 30 from among the intra prediction unit 34 and the motion prediction compensation unit 35, and supplies the predicted image supplied from the selected supply source to the operation unit 23 and the operation unit 30.

The rate control unit 37 controls the rate of the quantization operation of the quantization unit 25 so that overflow or underflow does not occur on the basis of the code amount of the coded bit stream accumulated in the accumulation buffer 27. That is, the rate control unit 37 sets a target code amount of the coded bit stream so that overflow and underflow of the accumulation buffer 27 do not occur, and supplies the target code amount to the quantization unit 25.

The deblocking filter 31*a* applies a deblocking filter to the decoded image from the operation unit 30 as necessary, and supplies a decoded image (filtered image) to which the deblocking filter is applied or a decoded image to which the deblocking filter is not applied to the adaptive offset filter 41.

The adaptive offset filter 41 applies an adaptive offset filter to the decoded image from the deblocking filter 31*a* as necessary, and supplies the decoded image (filtered image) to which the adaptive offset filter is applied or the decoded image to which the adaptive offset filter is not applied to the ALF 42.

The ALF 42 applies the ALF to the decoded image from the adaptive offset filter 41 as necessary, and supplies the decoded image to which the ALF is applied or the decoded image to which the ALF is not applied to the frame memory 32.

<Encoding Processing>

Figure 67:
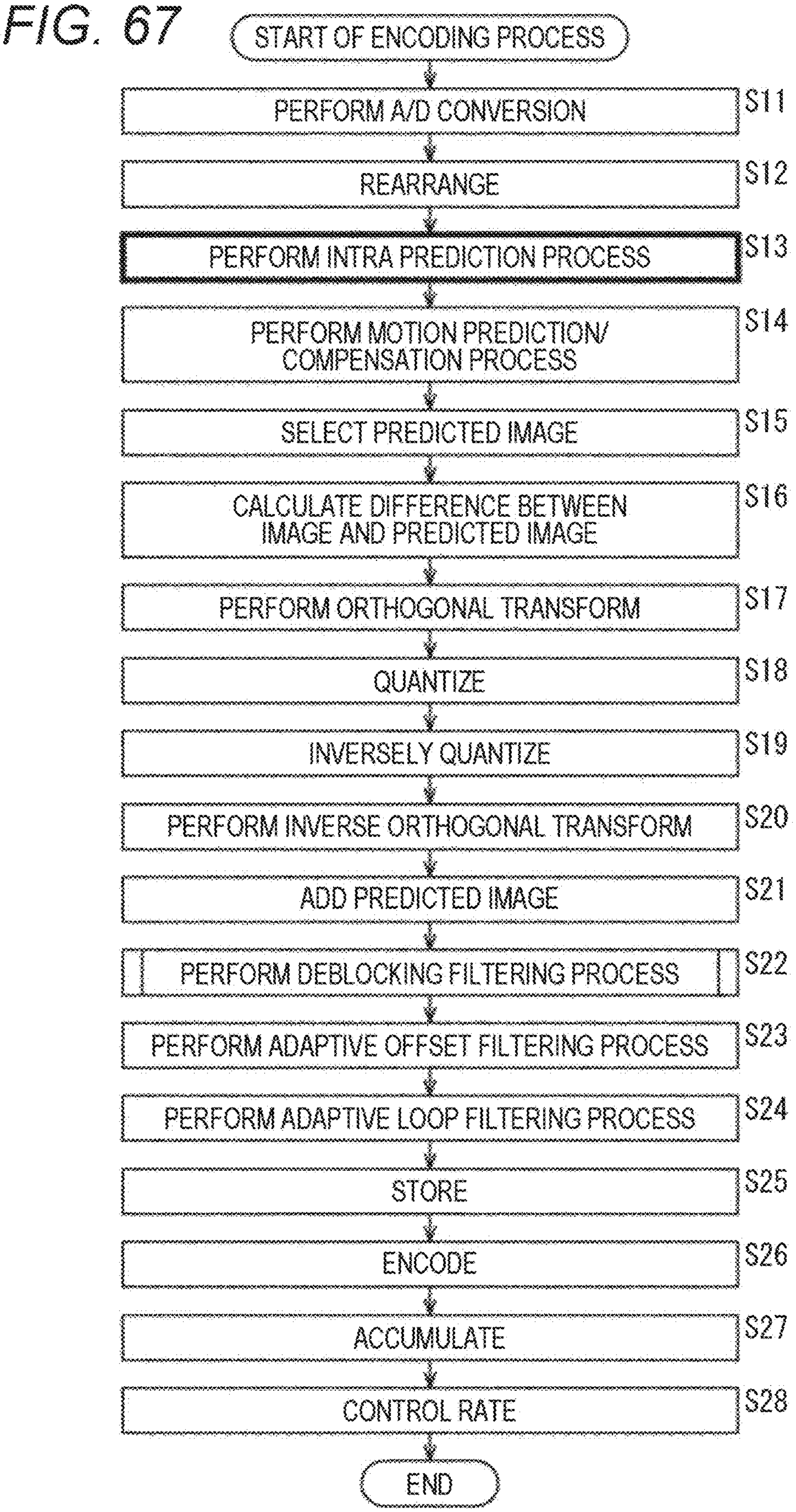
FIG. 67 is a flowchart describing an example of encoding processing of the encoder 11.

FIG. 67 is a flowchart describing an example of encoding processing of the encoder 11 in FIG. 66.

Note that the order of respective steps of the encoding processing illustrated in FIG. 67 is an order for convenience of description, and the steps of actual encoding processing are appropriately performed in parallel in a necessary order. This similarly applies to processing described later.

In the encoder 11, in step S11, the A/D conversion unit 21 A/D-converts the original image and supplies the original image to the rearrangement buffer 22, and the processing proceeds to step S12.

In step S12, the rearrangement buffer 22 stores the original image from the A/D conversion unit 21, rearranges the original image in the encoding order, and outputs the original image, and the processing proceeds to step S13.

In step S13, the intra prediction unit 34 performs intra prediction (intra prediction step), and the processing proceeds to step S14. In step S14, the motion prediction compensation unit 35 performs inter prediction for performing motion prediction or motion compensation, and the processing proceeds to step S15.

In the intra prediction of the intra prediction unit 34 and the inter prediction of the motion prediction compensation unit 35, cost functions of various prediction modes are calculated, and a predicted image is generated.

In step S15, the predicted image selection unit 36 determines the optimum prediction mode on the basis of each cost function obtained by the intra prediction unit 34 and the motion prediction compensation unit 35. Then, the predicted image selection unit 36 selects and outputs a predicted image in the optimum prediction mode from the predicted image generated by the intra prediction unit 34 and the predicted image generated by the motion prediction compensation unit 35, and the processing proceeds from step S15 to step S16.

In step S16, the operation unit 23 calculates the residual between the encoding target image that is the original image output from the rearrangement buffer 22 and the predicted image output from the predicted image selection unit 36, and supplies the residual to the orthogonal transform unit 24, and the processing proceeds to step S17.

In step S17, the orthogonal transform unit 24 orthogonally transforms the residual from the operation unit 23 and supplies an orthogonal transform coefficient obtained as a result to the quantization unit 25, and the processing proceeds to step S18.

In step S18, the quantization unit 25 quantizes the orthogonal transform coefficient from the orthogonal transform unit 24 and supplies a quantization coefficient obtained by the quantization to the reversible encoding unit 26 and the inverse quantization unit 28, and the processing proceeds to step S19.

In step S19, the inverse quantization unit 28 inversely quantizes the quantization coefficient from the quantization unit 25 and supplies the orthogonal transform coefficient obtained as a result to the inverse orthogonal transform unit 29, and the processing proceeds to step S20. In step S20, the inverse orthogonal transform unit 29 inversely orthogonally transforms the orthogonal transform coefficient from the inverse quantization unit 28 and supplies the residual obtained as a result to the operation unit 30, and the processing proceeds to step S21.

In step S21, the operation unit 30 adds the residual from the inverse orthogonal transform unit 29 and the predicted image output by the predicted image selection unit 36, and generates a decoded image corresponding to the original image that is the target of operation of the residual in the operation unit 23. The operation unit 30 supplies the decoded image to the deblocking filter 31*a*, and the processing proceeds from step S21 to step S22.

In step S22, the deblocking filter 31*a* applies the deblocking filter to the decoded image from the operation unit 30 and supplies the filtered image obtained as a result to the adaptive offset filter 41, and the processing proceeds to step S23.

In step S23, the adaptive offset filter 41 applies the adaptive offset filter to the filtered image from the deblocking filter 31*a* and supplies the filtered image obtained as a result to the ALF 42, and the processing proceeds to step S24.

In step S24, the ALF 42 applies the ALF to the filtered image from the adaptive offset filter 41 and supplies the filtered image obtained as a result to the frame memory 32, and the processing proceeds to step S25.

In step S25, the frame memory 32 stores the filtered image supplied from the ALF 42, and the processing proceeds to step S26. The filtered image stored in the frame memory 32 is used as a reference image from which the predicted image is generated in steps S13 and S14.

In step S26, the reversible encoding unit 26 encodes the coded data that is the quantization coefficient from the quantization unit 25, and generates a coded bit stream including the coded data. Moreover, the reversible encoding unit 26 encodes, as necessary, encoding information such as the quantization parameter used for quantization by the quantization unit 25, the prediction mode obtained by intra prediction by the intra prediction unit 34, the prediction mode and motion information obtained by inter prediction by the motion prediction compensation unit 35, and filter parameters of the deblocking filter 31*a* and the adaptive offset filter 41, and includes the encoding information in the coded bit stream.

Then, the reversible encoding unit 26 supplies the coded bit stream to the accumulation buffer 27, and the processing proceeds from step S26 to step S27.

In step S27, the accumulation buffer 27 accumulates the coded bit stream from the reversible encoding unit 26, and the processing proceeds to step S28. The coded bit stream accumulated in the accumulation buffer 27 is appropriately read and transmitted.

In step S28, the rate control unit 37 controls the rate of the quantization operation of the quantization unit 25 so that overflow or underflow does not occur on the basis of the code amount (generated code amount) of the coded bit stream accumulated in the accumulation buffer 27, and the encoding processing ends.

<Configuration Example of Decoder 51>

Figure 68:
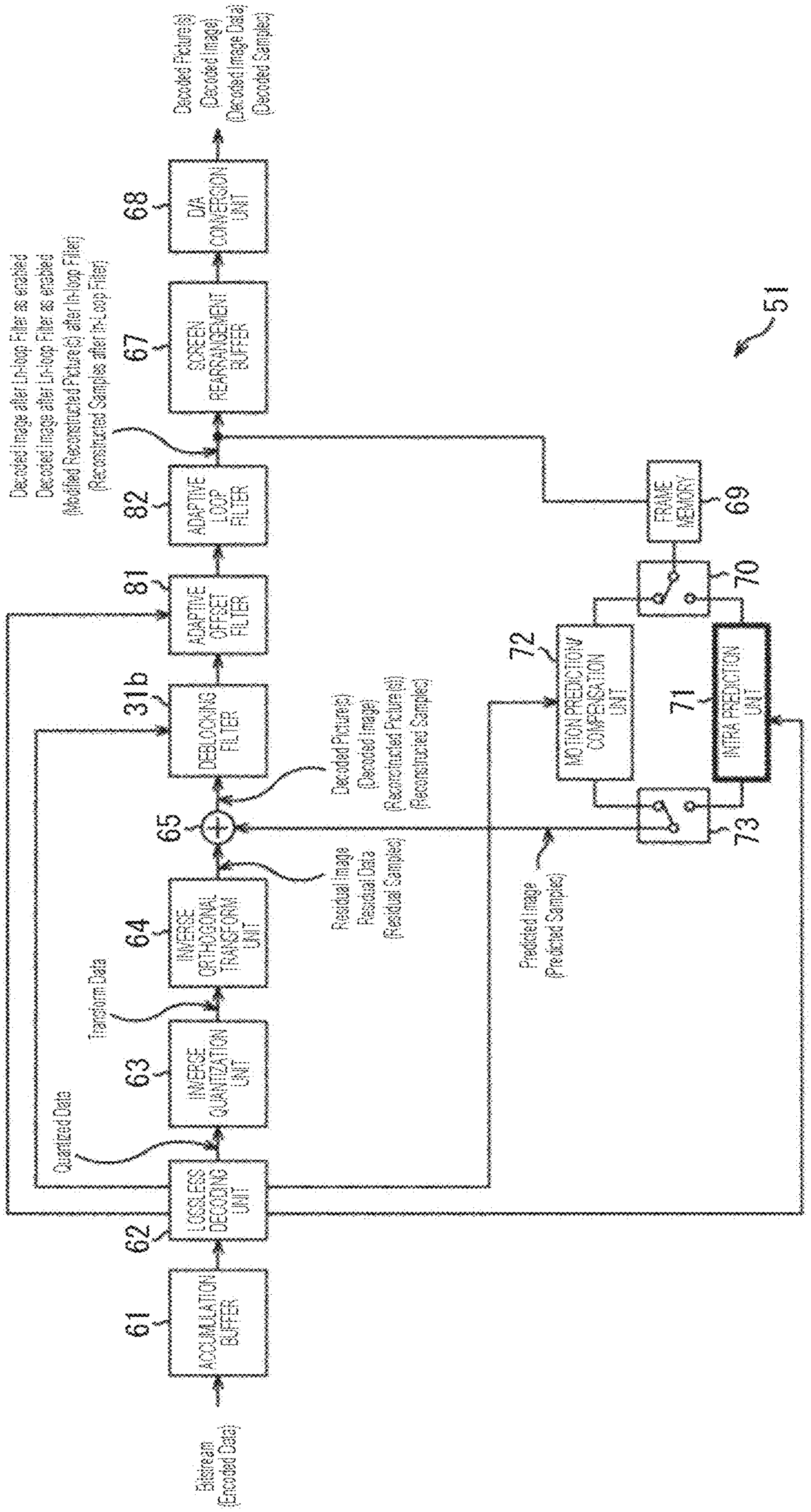
FIG. 68 is a block diagram illustrating a detailed configuration example of a decoder 51.

FIG. 68 is a block diagram illustrating a detailed configuration example of the decoder 51 in FIG. 65.

In FIG. 68, the decoder 51 includes an accumulation buffer 61, a reversible decoding unit 62, an inverse quantization unit 63, an inverse orthogonal transform unit 64, an operation unit 65, a rearrangement buffer 67, and a D/A conversion unit 68. Moreover, the decoder 51 includes a frame memory 69, a selection unit 70, an intra prediction unit 71, a motion prediction compensation unit 72, and a selection unit 73. Furthermore, the decoder 51 includes a deblocking filter 31*b*, an adaptive offset filter 81, and an ALF 82.

The accumulation buffer 61 temporarily accumulates the coded bit stream transmitted from the encoder 11, and supplies the coded bit stream to the reversible decoding unit 62 at a predetermined timing.

The reversible decoding unit 62 receives the coded bit stream from the accumulation buffer 61, and decodes the coded bit stream by a method corresponding to the encoding method of the reversible encoding unit 26 in FIG. 66.

Then, the reversible decoding unit 62 supplies the quantization coefficient as the coded data included in the decoding result of the coded bit stream to the inverse quantization unit 63.

Furthermore, the reversible decoding unit 62 has a function of performing parsing. The reversible decoding unit 62 parses necessary encoding information included in the decoding result of the coded bit stream, and supplies the encoding information to the intra prediction unit 71, the motion prediction compensation unit 72, the deblocking filter 31*b*, the adaptive offset filter 81, and other necessary blocks.

The inverse quantization unit 63 inversely quantizes the quantization coefficient as the coded data from the reversible decoding unit 62 by a method corresponding to the quantization method of the quantization unit 25 in FIG. 66, and supplies an orthogonal transform coefficient obtained by the inverse quantization to the inverse orthogonal transform unit 64.

The inverse orthogonal transform unit 64 inversely orthogonally transforms the orthogonal transform coefficient supplied from the inverse quantization unit 63 by a method corresponding to the orthogonal transform method of the orthogonal transform unit 24 in FIG. 66, and supplies the residual obtained as a result to the operation unit 65.

The operation unit 65 is supplied with the residual from the inverse orthogonal transform unit 64, and is supplied with the predicted image from the intra prediction unit 71 or the motion prediction compensation unit 72 via the selection unit 73.

The operation unit 65 adds the residual from the inverse orthogonal transform unit 64 and the predicted image from the selection unit 73, generates a decoded image, and supplies the decoded image to the deblocking filter 31*b*.

Here, the reversible decoding unit 62 to the operation unit 65 described above constitute a decoding unit that decodes an image, and processing (step) performed by the decoding unit is a decoding step.

The rearrangement buffer 67 temporarily stores the decoded image supplied from the ALF 82, rearranges the arrangement of frames (pictures) of the decoded image from the encoding (decoding) order to the display order, and supplies the decoded image to the D/A conversion unit 68.

The D/A conversion unit 68 D/A converts the decoded image supplied from the rearrangement buffer 67, outputs the decoded image to a display (not illustrated), and causes the display to display the decoded image. Note that in a case where a device connected to the decoder 51 receives an image of a digital signal, the decoder 51 can be configured without the D/A conversion unit 68.

The frame memory 69 temporarily stores the decoded image supplied from the ALF 82. Moreover, the frame memory 69 supplies the decoded image to the selection unit 70 as the reference image to be used for generation of the predicted image at a predetermined timing or on the basis of an external request of the intra prediction unit 71, the motion prediction compensation unit 72, or the like.

The selection unit 70 selects a supply destination of the reference image supplied from the frame memory 69. In a case of decoding an image encoded by intra prediction, the selection unit 70 supplies the reference image supplied from the frame memory 69 to the intra prediction unit 71. Furthermore, in a case of decoding an image encoded by inter prediction, the selection unit 70 supplies the reference image supplied from the frame memory 69 to the motion prediction compensation unit 72.

The intra prediction unit 71 performs intra prediction similar to that of the intra prediction unit 34 in FIG. 66 by using the reference image supplied from the frame memory 69 via the selection unit 70 in accordance with the prediction mode included in the encoding information supplied from the reversible decoding unit 62. Then, the intra prediction unit 71 supplies the predicted image obtained by the intra prediction to the selection unit 73.

The motion prediction compensation unit 72 performs inter prediction using the reference image supplied from the frame memory 69 via the selection unit 70, similarly to the motion prediction compensation unit 35 in FIG. 66, in accordance with the prediction mode included in the encoding information supplied from the reversible decoding unit 62. The inter prediction is performed using motion information or the like included in the encoding information supplied from the reversible decoding unit 62 as necessary.

The motion prediction compensation unit 72 supplies the predicted image obtained by the inter prediction to the selection unit 73.

The selection unit 73 selects the predicted image supplied from the intra prediction unit 71 or the predicted image supplied from the motion prediction compensation unit 72, and supplies the selected predicted image to the operation unit 65.

The deblocking filter 31*b* applies the deblocking filter to the decoded image from the operation unit 65 according to the filter parameter included in the encoding information supplied from the reversible decoding unit 62. The deblocking filter 31*b* supplies the decoded image (filtered image) to which the deblocking filter is applied or the decoded image to which the deblocking filter is not applied to the adaptive offset filter 81.

The adaptive offset filter 81 applies the adaptive offset filter to the decoded image from the deblocking filter 31*b* as necessary according to the filter parameter included in the encoding information supplied from the reversible decoding unit 62. The adaptive offset filter 81 supplies the ALF 82 with the decoded image (filtered image) to which the adaptive offset filter is applied or the decoded image to which the adaptive offset filter is not applied.

The ALF 82 applies the ALF to the decoded image from the adaptive offset filter 81 as necessary, and supplies the decoded image to which the ALF is applied or the decoded image to which the ALF is not applied to the rearrangement buffer 67 and the frame memory 69.

<Decoding Processing>

Figure 69:
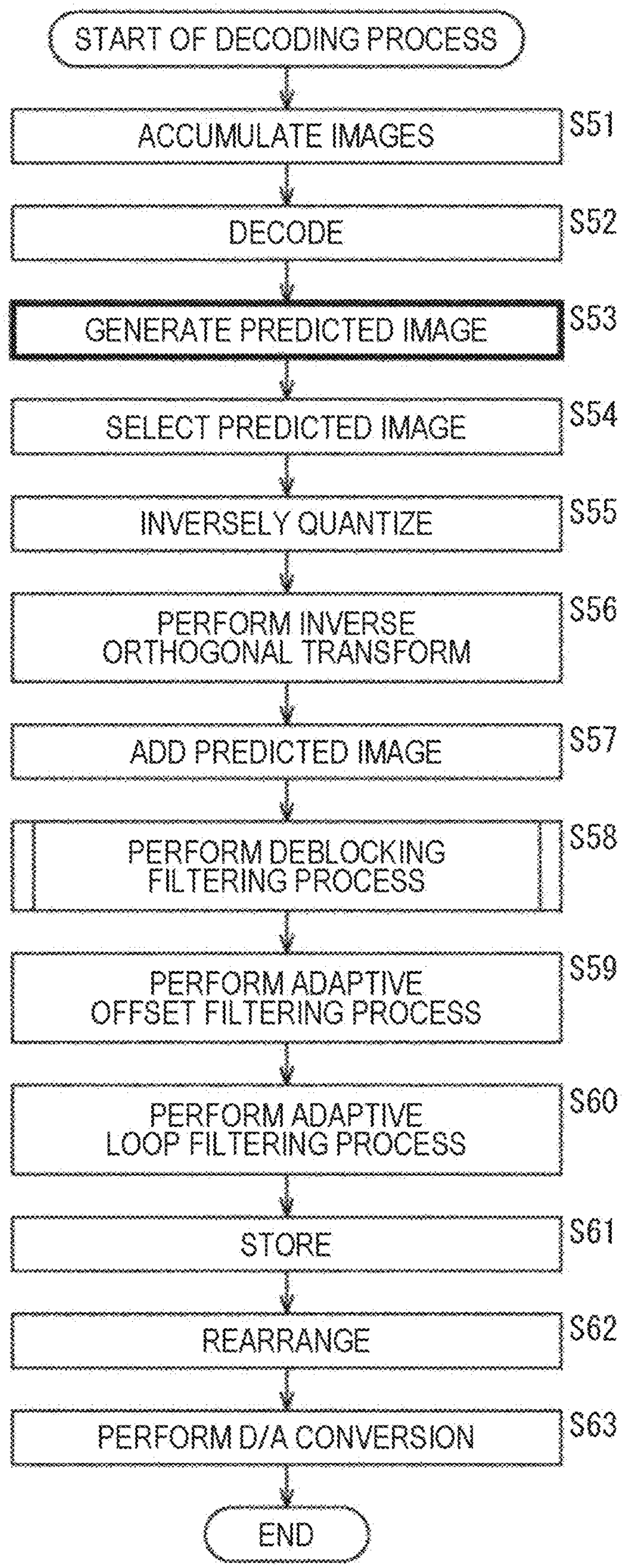
FIG. 69 is a flowchart describing an example of decoding processing of the decoder 51.

FIG. 69 is a flowchart describing an example of decoding processing of the decoder 51 in FIG. 68.

In the decoding processing, in step S51, the accumulation buffer 61 temporarily accumulates the coded bit stream transmitted from the encoder 11 and supplies the coded bit stream to the reversible decoding unit 62 as appropriate, and the processing proceeds to step S52.

In step S52, the reversible decoding unit 62 receives and decodes the coded bit stream supplied from the accumulation buffer 61, and supplies the quantization coefficient as the coded data included in the decoding result of the coded bit stream to the inverse quantization unit 63.

Furthermore, the reversible decoding unit 62 parses the encoding information included in the decoding result of the coded bit stream. Then, the reversible decoding unit 62 supplies necessary encoding information to the intra prediction unit 71, the motion prediction compensation unit 72, the deblocking filter 31*b*, the adaptive offset filter 81, and other necessary blocks.

Then, the processing proceeds from step S52 to step S53, and the intra prediction unit 71 or the motion prediction compensation unit 72 performs intra prediction or inter prediction for generating a predicted image according to the reference image supplied from the frame memory 69 via the selection unit 70 and the encoding information supplied from the reversible decoding unit 62 (intra prediction step or inter prediction step). Then, the intra prediction unit 71 or the motion prediction compensation unit 72 supplies the predicted image obtained by the intra prediction or the inter prediction to the selection unit 73, and the processing proceeds from step S53 to step S54.

In step S54, the selection unit 73 selects the predicted image supplied from the intra prediction unit 71 or the motion prediction compensation unit 72 and supplies the predicted image to the operation unit 65, and the processing proceeds to step S55.

In step S55, the inverse quantization unit 63 inversely quantizes the quantization coefficient from the reversible decoding unit 62 and supplies the orthogonal transform coefficient obtained as a result to the inverse orthogonal transform unit 64, and the processing proceeds to step S56.

In step S56, the inverse orthogonal transform unit 64 inversely orthogonally transforms the orthogonal transform coefficient from the inverse quantization unit 63 and supplies the residual obtained as a result to the operation unit 65, and the processing proceeds to step S57.

In step S57, the operation unit 65 generates the decoded image by adding the residual from the inverse orthogonal transform unit 64 and the predicted image from the selection unit 73. Then, the operation unit 65 supplies the decoded image to the deblocking filter 31*b*, and the processing proceeds from step S57 to step S58.

In step S58, the deblocking filter 31*b* applies the deblocking filter to the decoded image from the operation unit 65 according to the filter parameter included in the encoding information supplied from the reversible decoding unit 62. The deblocking filter 31*b* supplies the filtered image obtained as a result of applying the deblocking filter to the adaptive offset filter 81, and the processing proceeds from step S58 to step S59.

In step S59, the adaptive offset filter 81 applies the adaptive offset filter to the filtered image from the deblocking filter 31*b* according to the filter parameter included in the encoding information supplied from the reversible decoding unit 62. The adaptive offset filter 81 supplies the filtered image obtained as a result of the application of the adaptive offset filter to the ALF 82, and the processing proceeds from step S59 to step S60.

The ALF 82 applies the ALF to the filtered image from the adaptive offset filter 81 and supplies the filtered image obtained as a result to the rearrangement buffer 67 and the frame memory 69, and the processing proceeds to step S61.

In step S61, the frame memory 69 temporarily stores the filtered image supplied from the ALF 82, and the processing proceeds to step S62. The filtered image (decoded image) stored in the frame memory 69 is used as the reference image that is the source for generating the predicted image in the intra prediction or the inter prediction in step S53.

In step S62, the rearrangement buffer 67 rearranges the filtered images supplied from the ALF 82 in the display order and supplies the rearranged filtered images to the D/A conversion unit 68, and the processing proceeds to step S63.

In step S63, the D/A conversion unit 68 D/A-converts the filtered image from the rearrangement buffer 67, and the decoding processing ends. The filtered image (decoded image) after the D/A conversion is output to and displayed on a display (not illustrated).

The intra prediction performed by the intra prediction unit 34 of FIG. 66 and the intra prediction unit 71 of FIG. 68 includes MIP. In the intra prediction units 34 and 71, the predicted image of the MIP can be generated by the second MIP method.

<Others>

The present technology can be applied to any image encoding and decoding method. That is, as long as it does not contradict the present technology described above, the specifications of various processes related to the image encoding and decoding, such as conversion (inverse conversion), quantization (inverse quantization), encoding (decoding), and prediction are arbitrary, and are not limited to the above-described examples. Furthermore, some of these processes may be omitted as long as they do not contradict the present technology described above.

Furthermore, in the present description, a "block" (not a block indicating a processing unit) used in the description as a partial area of an image (picture) or a processing unit indicates an arbitrary partial area in the picture unless otherwise specified, and does not limit its size, shape, characteristics, and the like. For example, the "block" includes any partial area (processing unit) such as transform block (TB), transform unit (TU), prediction block (PB), prediction unit (PU), smallest coding unit (SCU), coding unit (CU), largest coding unit (LCU), coding tree block (CTB), coding tree unit (CTU), conversion block, sub-block, macroblock, tile, or slice, and the like described in References REF 1 to REF 3 above.

The data units in which the various information described above is set and the data units targeted by the various processes are arbitrary and are not limited to the above-described examples. For example, these pieces of information and processes may be set in every transform unit (TU), transform block (TB), prediction unit (PU), prediction block (PB), coding unit (CU), largest coding unit (LCU), sub-block, block, tile, slice, picture, sequence, or component, or data in those data units may be targeted. Of course, this data unit can be set for every piece of information or process, and it is not necessary that the data units of all the pieces of information or processes are unified. Note that the storage location of these pieces of information is arbitrary, and may be stored in a header, parameter set, or the like of the above-described data units. Furthermore, it may be stored in a plurality of places.

The control information related to the present technology described above may be transmitted from the encoding side to the decoding side. For example, control information (for example, enabled flag) for controlling whether or not to permit (or prohibit) the application of the present technology described above may be transmitted. Furthermore, for example, control information indicating a target to which the above-described present technology is applied (or a target to which the present technology is not applied) may be transmitted. For example, control information specifying a block size (upper limit or lower limit or both), a frame, a component, a layer, or the like to which the present technology is applied (or permit or prohibit the application) may be transmitted.

Upon specifying the size of the block by which the present technology is applied, not only the block size may be specified directly, but also the block size may be indirectly specified. For example, the block size may be designated using identification data for identifying the size. Furthermore, for example, the block size may be designated by a ratio or a difference from the size of a reference block (for example, an LCU, an SCU, or the like). For example, in a case where information for designating a block size is transmitted as a syntax element or the like, information for indirectly designating a size as described above may be used as the information. In this manner, the amount of information of the information can be reduced, and encoding efficiency may be improved. Furthermore, the specification of the block size also includes a specification of the range of the block size (for example, the specification of the range of an allowable block size, or the like).

Note that in the present description, "identification data" is information for identifying a plurality of states, and includes "flag" and other names. Furthermore, the "identification data" includes not only information used to identify two states of true (1) and false (0) but also information capable of identifying three or more states. Therefore, the value that this "identification data" can take may be, for example, a binary of 1 or 0 or a ternary or more. That is, the number of bits constituting the "identification data" is arbitrary, and may be one bit or a plurality of bits. Furthermore, since the identification data is assumed to include not only the identification data in the bit stream but also include difference information of the identification data with respect to certain reference information in the bit stream, in the present description, the "identification data" includes not only the information but also difference information with respect to the reference information.

Furthermore, various types of information (metadata and the like) related to the coded data (bit stream) may be transmitted or recorded in any form as long as the information is associated with the coded data. Here, the term "associate" means, for example, that one data can be used (linked) when the other data is processed. That is, the data associated with each other may be combined as one piece of data or may be individual pieces of data. For example, information associated with coded data (image) may be transmitted on a transmission path different from that of the coded data (image). Furthermore, for example, the information associated with the coded data (image) may be recorded in a recording medium (or another recording area of the same recording medium) different from the coded data (image). Note that this "association" may be for a part of data instead of the entire data. For example, an image and information corresponding to the image may be associated with each other in an arbitrary unit such as a plurality of frames, one frame, or a part in a frame.

Note that in the present description, terms such as "combine", "multiplex", "add", "integrate", "include", "store", "put in", "plug in", and "insert" mean to combine a plurality of items into one, for example, such as combining coded data and metadata into one piece of data, and mean one method of the above-described "association".

The present technology can also be implemented as any configuration constituting a device or a system, for example, a processor as a system large scale integration (LSI) or the like, a module using a plurality of processors or the like, a unit using a plurality of modules or the like, a set obtained by further adding other functions to a unit, or the like (that is, a configuration of a part of the device).

<Description of Computer to which Present Technology is Applied>

Next, all or part of the above-described series of processes can be performed by hardware or software. In a case where all or a part of the series of processes is performed by software, a program constituting the software is installed in a general-purpose computer or the like.

Figure 70:
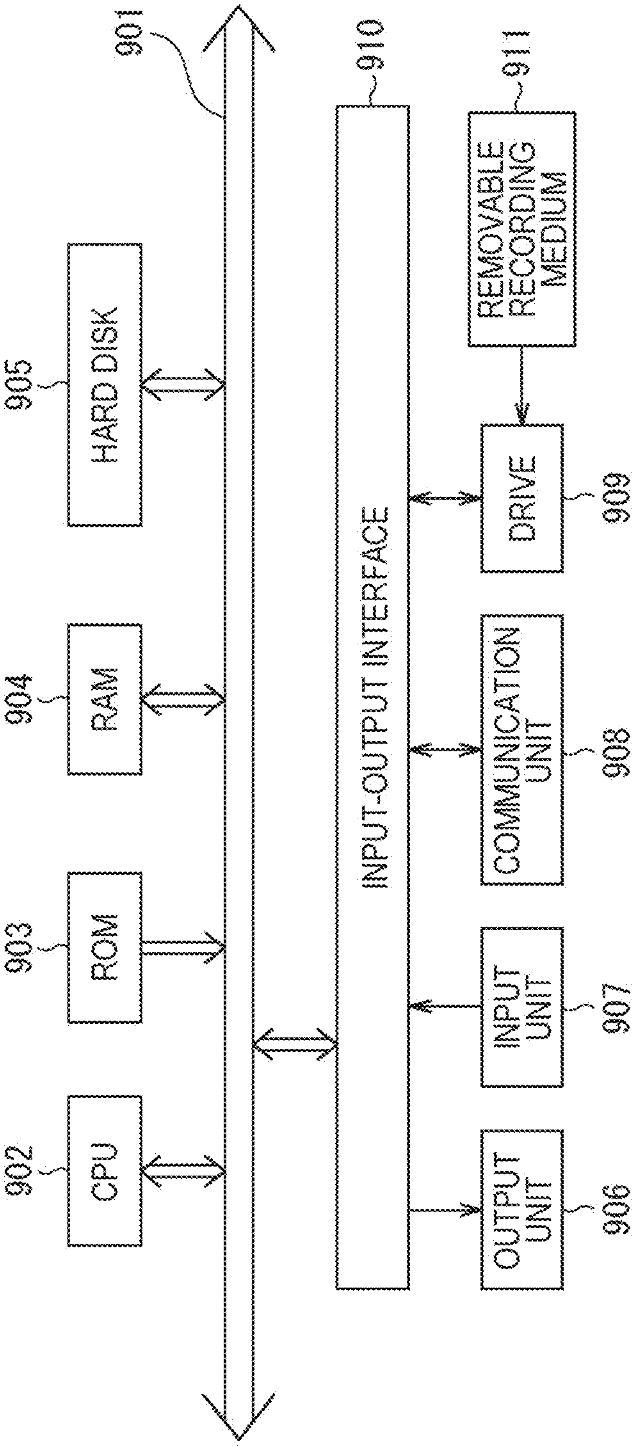
FIG. 70 is a block diagram illustrating a configuration example of an embodiment of a computer to which the present technology is applied.

FIG. 70 is a block diagram illustrating a configuration example of an embodiment of a computer in which a program for executing all or a part of the series of processes described above is installed.

The program can be pre-recorded on a hard disk 905 or ROM 903 as a recording medium incorporated in the computer.

Alternatively, the program can be stored (recorded) in a removable recording medium 911 driven by a drive 909. Such a removable recording medium 911 can be provided as what is called package software. Here, examples of the removable recording medium 911 include, for example, a flexible disk, a compact disc read only memory (CD-ROM), a magneto optical (MO) disk, a digital versatile disc (DVD), a magnetic disk, a semiconductor memory, and the like.

Note that in addition to installing the program on the computer from the removable recording medium 911 as described above, the program can be downloaded to the computer via a communication network or a broadcasting network and installed on the incorporated hard disk 905. That is, for example, the program can be transferred to the computer wirelessly from a download site via an artificial satellite for digital satellite broadcasting, or transferred to the computer by wire via a network such as a local area network (LAN) or the Internet.

The computer has an incorporated central processing unit (CPU) 902, and an input-output interface 910 is connected to the CPU 902 via a bus 901.

If a command is input by a user through the input-output interface 910 by operating an input unit 907 or the like, the CPU 902 executes the program stored in the read only memory (ROM) 903 accordingly. Alternatively, the CPU 902 loads the program stored in the hard disk 905 into a random access memory (RAM) 904 and executes the program.

Thus, the CPU 902 performs the processing according to the above-described flowchart or the processing performed according to the above-described configuration of the block diagram. Then, the CPU 902 outputs a processing result thereof from an output unit 906 or sends the processing result from a communication unit 908 if necessary via the input-output interface 910 for example, and further causes recording of the processing result on the hard disk 905, or the like.

Note that the input unit 907 includes a keyboard, a mouse, a microphone, and the like. Furthermore, the output unit 906 includes a liquid crystal display (LCD), a speaker, and the like.

Here, in the present description, the processing performed by the computer according to the program does not necessarily have to be performed in time series in the order described as the flowchart. That is, the processing performed by the computer according to the program also includes processing that is executed in parallel or individually (for example, parallel processing or object processing).

Furthermore, the program may be processed by one computer (processor) or may be processed in a distributed manner by a plurality of computers. Moreover, the program may be transferred to a distant computer and executed.

Moreover, in the present description, a system means a set of a plurality of components (devices, modules (parts), and the like), and it does not matter whether or not all components are in the same housing. Therefore, both of a plurality of devices housed in separate housings and connected via a network and a single device in which a plurality of modules is housed in one housing are systems.

Note that the embodiments of the present technology are not limited to the above-described embodiments, and various modifications are possible without departing from the gist of the present technology.

For example, the present technology can employ a configuration of cloud computing in which one function is shared by a plurality of devices via a network and processed jointly.

Furthermore, each step described in the above-described flowcharts can be executed by one device, or can be executed in a shared manner by a plurality of devices.

Moreover, in a case where a plurality of processes is included in one step, the plurality of processes included in the one step can be executed in a shared manner by a plurality of devices in addition to being executed by one device.

Furthermore, the effects described in the present description are merely examples and are not limited, and other effects may be provided.

REFERENCE SIGNS LIST

10 Image processing system
11 Encoder
21 A/D conversion unit
22 Rearrangement buffer 22
23 Operation unit
24 Orthogonal transform unit
25 Quantization unit
26 Reversible encoding unit
27 Accumulation buffer
28 Inverse quantization unit
29 Inverse orthogonal transform unit
30 Operation unit
31*a*, 31*b* Deblocking filter
32 Frame memory
33 Selection unit
34 Intra prediction unit
35 Motion prediction compensation unit
36 Predicted image selection unit
37 Rate control unit
41 Adaptive offset filter
42 ALF
51 Decoder
61 Accumulation buffer
62 Reversible decoding unit
63 Inverse quantization unit
64 Inverse orthogonal transform unit
65 Operation unit
67 Rearrangement buffer
68 D/A conversion unit
69 Frame memory
70 Selection unit
71 Intra prediction unit
72 Motion prediction compensation unit
73 Selection unit
81 Adaptive offset filter
82 ALF

901 Bus
902 CPU
903 ROM
904 RAM
905 Hard disk
906 Output unit
907 Input unit
908 Communication unit
909 Drive
910 Input-output interface
911 Removable recording medium

The invention claimed is:

1. An image processing device comprising:
circuitry that
when performing matrix-based intra prediction that is intra prediction using a matrix operation on a current prediction block to be encoded, performs the matrix-based intra prediction using a coefficient related to a sum of change amounts of pixel values and set to a fixed value,
generates a predicted image of the current prediction block, and
encodes the current prediction block using the predicted image generated,
wherein the circuitry performs the matrix-based intra prediction according to an operation including a weight matrix in which matrix values are offset according to at least the coefficient, and
the coefficient is only one of a value represented by a power of two or a value represented as a sum of powers of two.

2. The image processing device according to claim 1, wherein the coefficient is 32.

3. The image processing device according to claim 1, wherein the circuitry performs the matrix-based intra prediction using the coefficient and a shift amount set to a fixed value.

4. The image processing device according to claim 3, wherein the shift amount is six.

5. The image processing device according to claim 3, wherein the weight matrix is further changed according to the shift amount that are set to fixed values.

6. The image processing device according to claim 1, wherein the change amounts of pixel values is determined as differences between pixel values of pixels in the prediction block and a pixel value of a predetermined pixel in the prediction block.

7. The image processing device according to claim 6, wherein the predetermined pixel is an upper left pixel of the prediction block.

8. The image processing device according to claim 1, wherein the sum of change amounts of pixel values is multiplied by the coefficient in performing the matrix-based intra prediction.

9. The image processing device according to claim 8, wherein a value of the coefficient is represented as a power of two, and multiplication of the sum of change amounts of pixel values and the coefficient is performed via a shift operation.

10. An image processing method comprising:
when performing matrix-based intra prediction that is intra prediction using a matrix operation on a current prediction block to be encoded, performing the matrix-based intra prediction using a coefficient related to a sum of change amounts of pixel values and set to a fixed value;
generating a predicted image of the current prediction block; and
encoding the current prediction block using the predicted image generated,
wherein the matrix-based intra prediction is performed according to an operation including a weight matrix in which matrix values are offset according to at least the coefficient, and
the coefficient is only one of a value represented by a power of two or a value represented as a sum of powers of two.

11. An image processing device comprising:
circuitry that
when performing matrix-based intra prediction that is intra prediction using a matrix operation on a current prediction block to be decoded, performs the matrix-based intra prediction using a coefficient related to a sum of change amounts of pixel values and set to a fixed value,
generates a predicted image of the current prediction block, and
decodes the current prediction block using the predicted image generated,
wherein the circuitry performs the matrix-based intra prediction according to an operation including a weight matrix in which matrix values are offset according to at least the coefficient, and
the coefficient is only one of a value represented by a power of two or a value represented as a sum of powers of two.

12. An image processing method comprising:
when performing matrix-based intra prediction that is intra prediction using a matrix operation on a current prediction block to be decoded, performing the matrix-based intra prediction using a coefficient related to a sum of change amounts of pixel values and set to a fixed value;
generating a predicted image of the current prediction block; and
decoding the current prediction block using the predicted image generated,
wherein the matrix-based intra prediction is performed according to an operation including a weight matrix in which matrix values are offset according to at least the coefficient, and
the coefficient is only one of a value represented by a power of two or a value represented as a sum of powers of two.

* * * * *